US012659765B2

(12) United States Patent
Parker et al.

(10) Patent No.: US 12,659,765 B2
(45) Date of Patent: Jun. 16, 2026

(54) UPDATING NETWORK FUNCTIONS IN A TELECOMMUNICATIONS NETWORK UTILIZING ATOMIC CONFIGURATION SNAPSHOTS

(71) Applicant: Microsoft Technology Licensing, LLC, Redmond, WA (US)

(72) Inventors: Ronald Mark Parker, Manchester, MA (US); Mark Gordon Libby, Groton, MA (US); Michael Anthony Brown, McKinney, TX (US); Haibo Qian, Frisco, TX (US); Rahul Bose, Westford, MA (US); Alex Xiaoguang Xia, Lexington, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 405 days.

(21) Appl. No.: 18/296,190

(22) Filed: Apr. 5, 2023

(65) Prior Publication Data

US 2024/0340658 A1 Oct. 10, 2024

(51) Int. Cl.
| | |
|---|---|
| *H04W 24/02* | (2009.01) |
| *H04L 41/0853* | (2022.01) |
| *H04L 41/0869* | (2022.01) |

(52) U.S. Cl.
CPC ......... *H04W 24/02* (2013.01); *H04L 41/0856* (2013.01); *H04L 41/0869* (2013.01)

(58) Field of Classification Search
CPC ........................... H04L 41/0861; H04W 24/02

(Continued)

(56) References Cited

U.S. PATENT DOCUMENTS

| | | | |
|---|---|---|---|
| 6,877,051 | B2 | 4/2005 | Iwanojko |
| 8,949,305 | B1 | 2/2015 | White |

(Continued)

FOREIGN PATENT DOCUMENTS

WO 2022087256 A1 4/2022

OTHER PUBLICATIONS

International Search Report and Written Opinion received for PCT Application No. PCT/US2024/021243, Jun. 26, 2024, 16 pages.

(Continued)

*Primary Examiner* — Sibte H Bukhari
(74) *Attorney, Agent, or Firm* — Ray Quinney & Nebeker P.C.; James S. Bullough

(57) ABSTRACT

The present disclosure relates to a network function configuration system that efficiently, accurately, and flexibly manages network function configurations in a cloud computing system for a 5G (and beyond) telecommunications network. For example, the network function configuration system utilizes configuration snapshots to perform batches of configuration updates atomically to network functions of a mobile packet core that is implemented in a cloud computing system. To illustrate, in a cloud computing system (such as a core network), network functions run in a current state. To modify the configuration snapshot to a desired state, numerous network function configuration changes must often be applied. Rather than applying each configuration change individually, the network function system generates a configuration snapshot that stages the configuration changes and atomically applies them to the cloud computing system together, which provides several technical advantages and benefits over conventional systems, discussed in this disclosure.

20 Claims, 11 Drawing Sheets

(58) Field of Classification Search
USPC ......................................................... 370/252
See application file for complete search history.

(56) References Cited

U.S. PATENT DOCUMENTS

| | | | | |
|---|---|---|---|---|
| 10,374,886 | B1 * | 8/2019 | A | |
| 2021/0182082 | A1 * | 6/2021 | Mickelsson | ......... H04L 41/0813 |
| 2022/0321408 | A1 * | 10/2022 | Mahimkar | .......... H04L 41/0886 |

OTHER PUBLICATIONS

International Preliminary Report on Patentability (Chapter I) received for PCT Application No. PCT/US2024/021243, mailed on Oct. 16, 2025, 10 pages.

* cited by examiner

100

200

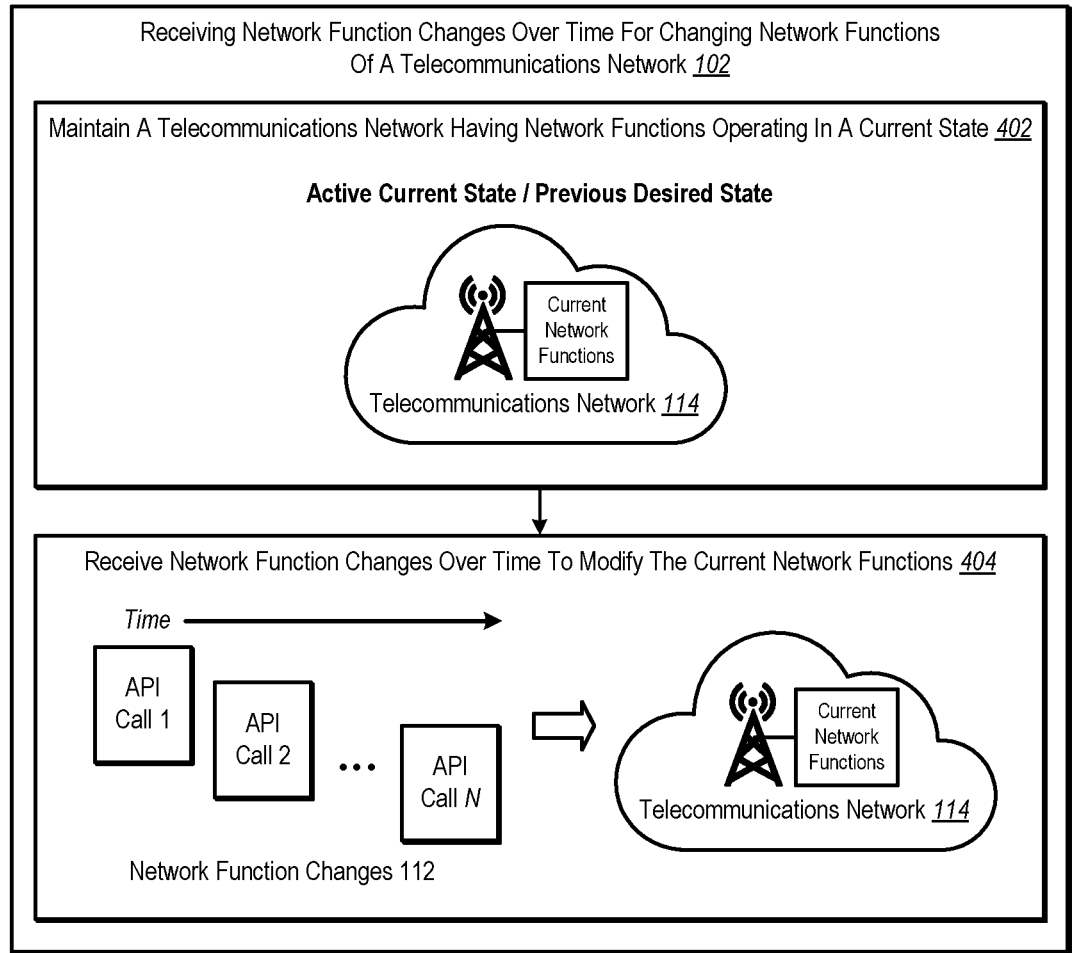

Receiving Network Function Changes Over Time For Changing Network Functions Of A Telecommunications Network _102_

Maintain A Telecommunications Network Having Network Functions Operating In A Current State _402_

Active Current State / Previous Desired State

Current Network Functions

Telecommunications Network _114_

Receive Network Function Changes Over Time To Modify The Current Network Functions _404_

Time

API Call 1

API Call 2

...

API Call *N*

Current Network Functions

Telecommunications Network _114_

Network Function Changes 112

FIG. 4

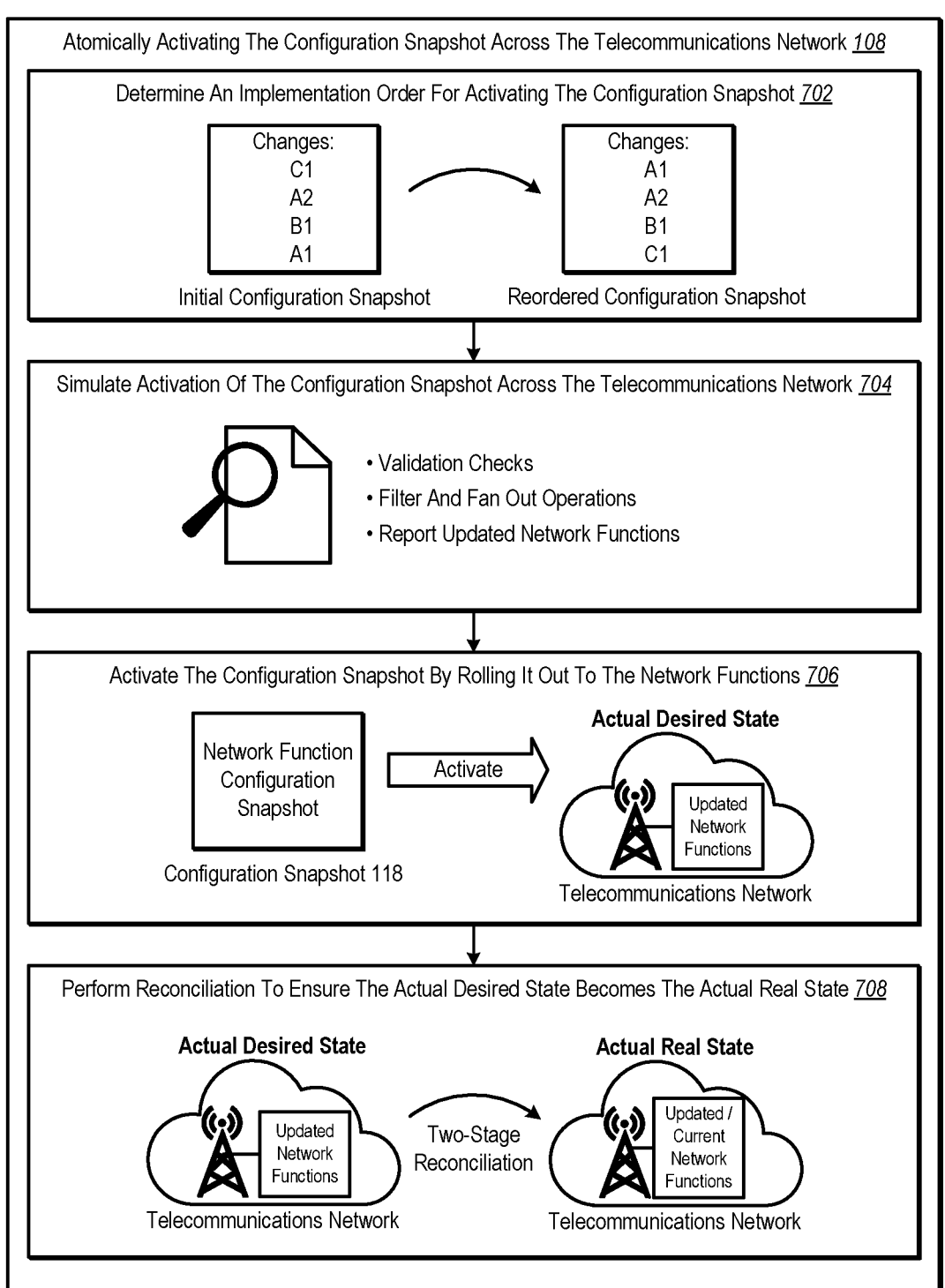

Atomically Activating The Configuration Snapshot Across The Telecommunications Network *108*

Determine An Implementation Order For Activating The Configuration Snapshot *702*

Changes:
C1
A2
B1
A1

Initial Configuration Snapshot

Changes:
A1
A2
B1
C1

Reordered Configuration Snapshot

Simulate Activation Of The Configuration Snapshot Across The Telecommunications Network *704*

• Validation Checks
• Filter And Fan Out Operations
• Report Updated Network Functions Activate The Configuration Snapshot By Rolling It Out To The Network Functions *706*

Network Function Configuration Snapshot

Configuration Snapshot 118

Activate

Actual Desired State

Updated Network Functions

Telecommunications Network

Perform Reconciliation To Ensure The Actual Desired State Becomes The Actual Real State *708*

Actual Desired State

Updated Network Functions

Telecommunications Network

Two-Stage Reconciliation

Actual Real State

Updated / Current Network Functions

Telecommunications Network

FIG. 7

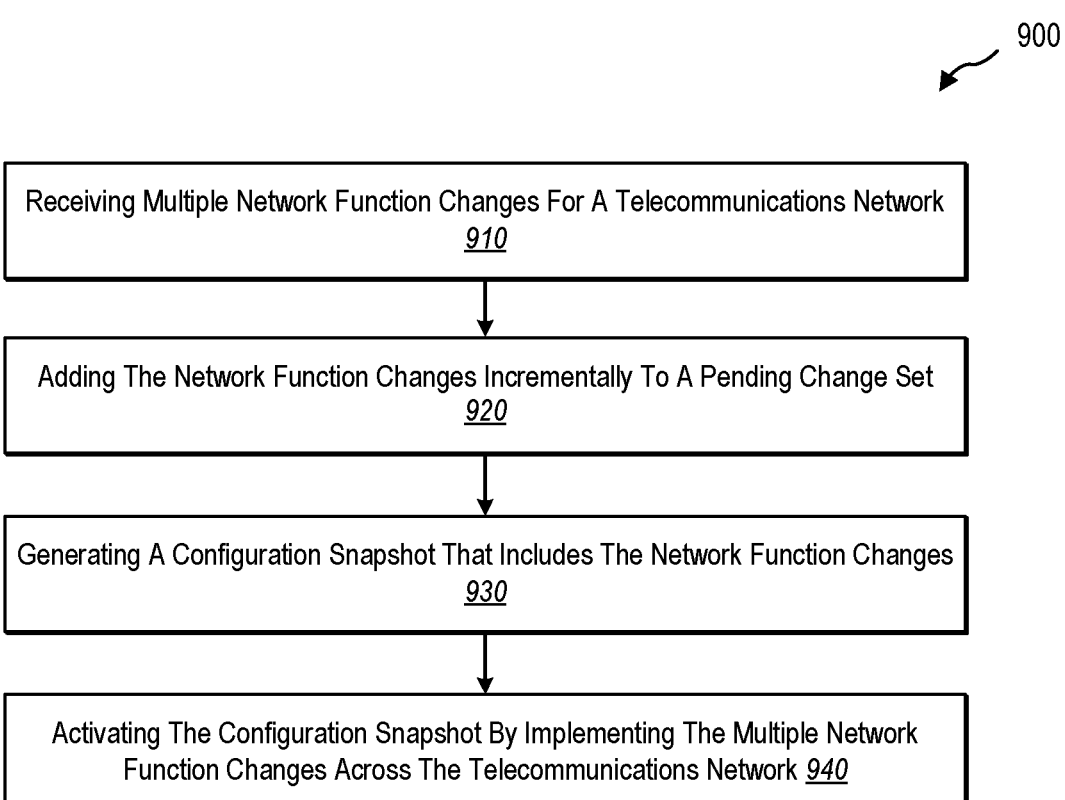

900

Receiving Multiple Network Function Changes For A Telecommunications Network
910

Adding The Network Function Changes Incrementally To A Pending Change Set
920

Generating A Configuration Snapshot That Includes The Network Function Changes
930

Activating The Configuration Snapshot By Implementing The Multiple Network
Function Changes Across The Telecommunications Network 940

Memory *1003*

Instructions *1005*

Data *1007*

Processor *1001*

Communication Interface(s) *1009*

1019

Input Device(s) *1011*

Output Device(s) *1013*

Display Device *1015*

Display Controller *1017*

UPDATING NETWORK FUNCTIONS IN A TELECOMMUNICATIONS NETWORK UTILIZING ATOMIC CONFIGURATION SNAPSHOTS

BACKGROUND

Cellular networks provide mobile devices and other computing devices with access to services from data networks. Cellular networks are part of telecommunications networks and include a radio access network (RAN), an edge network, and a core network. For example, a RAN includes base stations with communication components for interacting with components of a core network and/or a cloud computing system. A core network commonly includes several network functions that provide coverage and services to end-user devices and other computing devices.

Network functions within core networks have significantly evolved in recent years. To maintain these evolving network functions, many network functions allow for a wide variety of configuration settings for controlling how network functions operate within a respective computing environment. Network function configurations may vary based on where a network function is implemented geographically, the hardware on which the network function is deployed, individual deployment preferences, as well as other factors. With the continual increase in complexity and number of network functions in core networks, conventional systems have proven inadequate in efficiently and accurately maintaining network functions.

To illustrate, many conventional systems individually update configurations of network functions. Initially, this approach was sufficient as network functions on a core network were less complex and fewer in number. However, conventional systems now struggle to efficiently manage modern versions of network functions, and they often fail with the new, feature-rich versions. Further, this piecemeal approach by conventional systems can inaccurately result in introducing network function failures to a core network that are difficult to detect and even harder to resolve.

Additional, in simpler networks, network functions that share the same network function type could be updated with the same configuration settings. As network complexity evolves, however, some instances of network functions require different, unique configuration settings. In these cases, conventional systems often fail to recognize these instances of network functions and/or appropriately apply the unique configuration settings to them.

These and other problems discussed below exist in connection with managing network function resources across core networks of telecommunications networks.

BRIEF DESCRIPTION OF THE DRAWINGS

The detailed description provides one or more implementations with additional specificity and detail through the use of the accompanying drawings, as briefly described below. Each of the figures listed provides examples according to one or more implementations disclosed in this document.

FIG. 4 illustrates an example process for receiving network function changes for network functions in a cloud computing system of a core network.

FIG. 7 illustrates an example process for atomically activating a configuration snapshot for network functions across a cloud computing system of a core network.

FIG. 9 illustrates an example series of acts for managing network functions in a core network that may reside on a cloud computing system of a core network.

DETAILED DESCRIPTION

Figure 1:
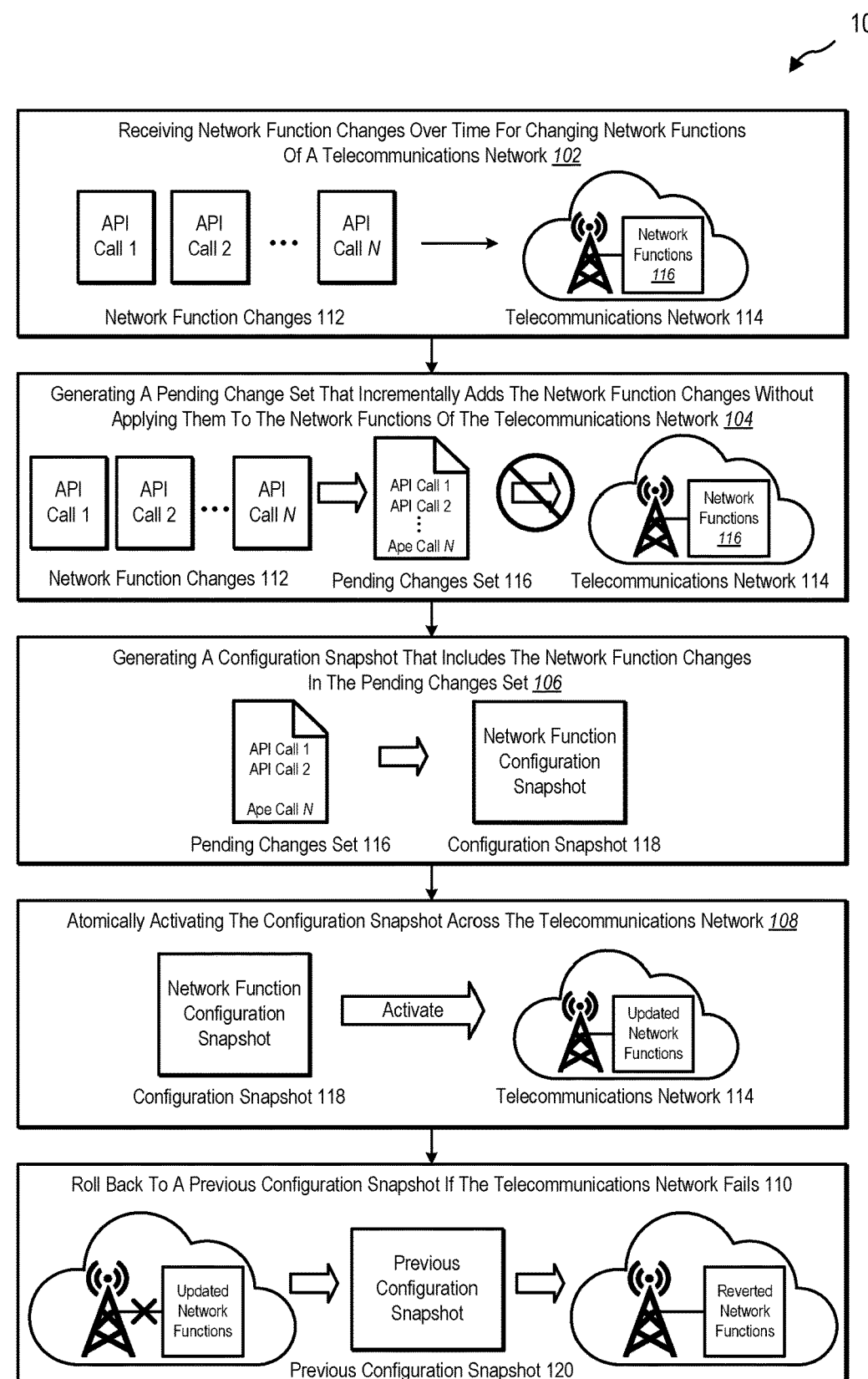
FIG. 1 illustrates an example overview of implementing a network function configuration system to facilitate atomic configuration changes to network functions in cloud computing systems of a core network of a telecommunications network.

The present disclosure describes a network function configuration system that efficiently, accurately, and flexibly manages network function configurations in a cloud computing system for a telecommunications network. For example, the network function configuration system utilizes configuration snapshots to perform batches of configuration updates atomically (e.g., only apply the configuration changes if they are self-consistent as a whole and they all successfully update) to network functions of a mobile packet core of a cloud computing system of a fifth-generation (5G) (and beyond) telecommunications network.

To illustrate briefly, a core network includes network functions running in a current or actual state. Based on a number of configuration changes, a user desires to update the network to a desired network state. For instance, the desired network state requires applying 95 configuration changes. Rather than having 95 undesired intermediate states, the network function configuration system generates a configuration snapshot that stages (e.g., stores) the 95 configuration changes and atomically applies them to the core network together such that the core network changes to an actual desired state. Moreover, in the above example the configuration changes may be invalid, inconsistent, and conflicting from changes 2-94. Accordingly, when individually applied, these changes could result in failures across the core network. However, when the 95 configuration changes are taken atomically as a whole, the changes are self-consistent and valid.

Additionally, in various implementations, the network function configuration system applies configuration changes to a core network using a fan out and filter process. In this manner, not only does the network function configuration system apply the many configuration changes by fanning out the configuration changes to the different types of network functions, but the network function configuration system additionally determines when to apply filtering to particular instances of network function configuration system that require unique configuration settings. Moreover, the filtering and fanout process allows a configuration snapshot to configure a core network as a whole rather than needing to configure each network function individually, one at a time.

For context, telecommunications networks, such as cellular networks, often include an enormous number of nodes, elements, and/or functions. When virtualized, these components are often on computing devices that are part of a cloud computing system. In one example, a modern cellular network with virtual components includes over dozens of different object types that include customizable network functions. With such a large, rich, and complex offering, the cellular network supports hundreds of different requests (e.g., application programming interface (API) calls). In addition to fulfilling requests, these network function configurations need continual updating and maintenance.

Accordingly, this document presents implementations where a network function configuration system utilizes various techniques and models to efficiently and accurately update network functions. Instead of directly and separately applying incoming network function changes to network functions in a mobile packet core, the network function configuration system stages the changes that arrive over a period of time and groups them into sets called pending changes sets. Additionally, the network function configuration system generates a configuration snapshot from the pending changes set and performs verification and validation checks. Further, the network function configuration system activates the configuration snapshot and applies the network function configuration system as a batch update across the core network. If issues arise with the core network after activation, the network function configuration system can roll back the network to a previous configuration snapshot version, as discussed below.

This disclosure relates to systems, methods, and computer-readable media for managing network function configurations in a telecommunications network. Specifically, this disclosure provides examples and implementations of a network function configuration system that performs batch updates of network functions atomically on a core network. Additionally, features and functionalities of the network function configuration system operate with respect to a hierarchical configuration model (e.g., a mobile packet core) within a core network.

The network function configuration system described in this document provides several technical benefits in terms of computing efficiency, accuracy, and flexibility compared to conventional systems. The network function configuration system also delivers several practical applications that solve problems associated with maintaining and updating network functions in a telecommunications network. Some of these benefits are discussed next while others are discussed further below.

To illustrate, the network function configuration system utilizes configuration snapshots to perform batch updates to the network function configuration system of a telecommunications network, such as a cellular network with a core network. Configuration snapshots offer several technical benefits over conventional systems that implement network function changes on a per-request basis. Unlike conventional systems, the network function configuration system receives network function changes incrementally over time and applies them in bulk as part of a configuration snapshot in an atomic commit process. Additionally, the network function configuration system utilizes configuration snapshots to apply updates to the entire state of a core network, from the top mobile packet core node to all child nodes (e.g., configuration objects).

By utilizing configuration snapshots, the network function configuration system solves problems related to intermediate dependency and intermediate states by delaying and applying all the configuration changes together. For instance, conventional systems often suffer from issues caused by intermediate dependencies, incomplete referenced resources, and intermediate states. An API call may include a dangling resource that is syntactically correct but missing until a later API call creates the resource. This also requires the user to rigidly apply API calls in a specific order that minimizes problematic intermediate states, where possible. Additionally, when numerous changes are applied in a row, it becomes challenging to determine which change (or combination of changes) caused problems and how to revert to the previous state. In contrast, the network function configuration system applies multiple network function changes together, eliminating intermediate state issues and negating the need to submit API calls for network function changes in a particular order.

Similarly, configuration snapshots provide the high level of flexibility required to manage the rich services provided by the latest cloud computing systems. The network function configuration system allows network function changes to be added incrementally, staged together in a pending changes set, and implemented in parallel. Otherwise, the numerous features and options provided by cloud computing systems could lead to system failures when requests are implemented piecemeal. Additionally, in various instances, the network function configuration system determines an implementation order to ensure efficient processing and rollout of network functions in a configuration snapshot.

As another example, the network function configuration system provides protection to the core network and cloud computing system against network failures by implementing configuration snapshots atomically. In some implementations, before implementing a configuration snapshot, the network function configuration system cross-validates all API calls to ensure their cooperation with each other. For example, the network function configuration system provides for layers of configuration to be made over time. During the time the changes are being made, the configuration may be inconsistent; however, at the end of the changes, the atomic configuration changes are self-consistent and valid. Additionally, unlike conventional systems that often allow the first change but disallow the second change that is required for the first change to work properly, the network function configuration system ensures that all changes in a configuration snapshot are successfully committed (e.g., an atomic commit), or the changes are invalidated, and a new (or updated) configuration snapshot can be created.

Furthermore, in one or more implementations, the network function configuration system allows for a simulated implementation of a configuration snapshot across a core network. This enables verification of whether a simulated rollout was successful before an actual rollout occurs. Additionally, in various implementations, if a configuration snapshot is successfully implemented, but a network experiences issues, the network function configuration system rolls back the network function configurations to a previously working configuration snapshot.

As illustrated in the foregoing discussion, the present disclosure utilizes a variety of terms to describe features and advantages of a network function configuration system within a variety of computing environments. Additional details will now be provided regarding the meaning of some of these terms.

For example, the term "cloud computing system" refers to a network of interconnected computing devices that provide various services to computing devices (e.g., customer devices). For example, a cloud computing system includes a collection of physical server devices (e.g., server nodes) organized in a hierarchical structure that includes clusters, computing zones, virtual local area networks (VLANs), racks, fault domains, etc. In one or more implementations, a portion of the cellular network (e.g., a core network) may be implemented entirely or partially on a cloud computing system. Additionally, a data network may be implemented on the same or on a different cloud computing network as the portion of the cellular network.

As another example, the term "telecommunications network" refers to a system of interconnected devices distributed over geographical areas that provide communication and data capabilities to end-user devices (e.g., mobile and non-mobile devices). In one or more implementations described herein, a telecommunications network refers to a cellular network that includes radio access network (RAN) components, core network components, and network functions implemented on server nodes on the cellular network. In particular, in one or more implementations described herein, the telecommunications network refers specifically to a fifth-generation (5G) network environment. However, other implementations may include previous generations (e.g., 2G, 3G, 4G) or future generations (6G and beyond) that utilize network functions implemented on computing devices of the telecommunications network.

As used herein, a "network function" refers to an entity in a telecommunications network that provides access to one or more services or applications of the telecommunications network. A network function may refer to a wide variety of network function types corresponding to different unique or defined functions or services that may be provided via the telecommunications network. Examples of network functions include physical functions, virtual network functions, or any of the various types of network functions. Examples of network functions include, but are not limited to, session management functions (SMFs), user plane functions (UPFs), access and mobility management functions (AMFs), and any other type of function that can be implemented within a telecommunications network. In one or more implementations, a network function may refer to any function or entity in a telecommunications network (e.g., 2G, 3G, 4G, 5G, or beyond cellular environment) that provides access to a service and/or application to a client of the telecommunications network.

In one or more implementations described herein, a network function may have an associated configuration. As used herein, a "network function configuration" or simply "configuration" refers to any information that indicates rules, commands, or policies associated with the operation or behavior of a network function within the framework of a telecommunications network. A configuration may include instructions associated with the lifecycle of a network function, such as its type, general behavior, configured services, and lifetime timeline. A configuration may also include instructions associated with configuration management (CM) policies, such as communication restrictions, security policies, deployment area-specific policies, or other behavioral rules or instructions. Further details and examples of configurations and various configuration policies will be discussed below.

As another example, a "deployment area" refers to an area within a telecommunications network in which a network function is deployed. In one or more implementations, a deployment area may refer specifically to a geographic area, such as a datacenter, a geographic region, a cluster (or group of clusters) of devices, an edge network, or other physical, logical, or geographic groupings of devices. In one or more implementations described herein, a deployment area refers to any grouping of devices as defined within a hierarchical configuration model. A deployment area may refer to a small grouping of devices (e.g., a specific server rack) or, alternatively, may refer to a large grouping of devices (e.g., an entire datacenter or a set of multiple datacenters).

As used herein, a "request" may refer to an expression of intent or command to implement a change to a network function on the telecommunications network. In various implementations, requests are made by way of an API call to the telecommunications network (e.g., to the mobile packet core node).

As used herein, a "hierarchical configuration model" refers to a diagram, such as a class diagram, that includes nodes organized hierarchically and has associated configuration instructions. As discussed in further detail below, a hierarchical configuration model may include a top-level node, such as a mobile packet core, with one or more configuration management policies that are globally applicable to network functions in a telecommunications network. The hierarchical configuration model may also include nodes and branches associated with different deployment areas of the telecommunications network as well as configuration management nodes and branches that include certain configuration management policies. Examples of nodes and branches of hierarchical configuration models are discussed in further detail below in connection with various implementations.

As another example, the terms "pending changes set," "change set," and "activation set" refer to a data structure that maintains a list of network function configuration changes received during a given time period, starting when a previous configuration snapshot is implemented and ending when the network function configuration system receives instructions to generate a new configuration snapshot. In many instances, a pending changes set includes a list of API calls for implementing configuration changes to network functions and/or other components of a telecommunications network, such as a core network.

As used herein, a "configuration snapshot" refers to a collection of network resources that are pending activation. For example, a configuration snapshot includes the network function configuration changes listed in a pending changes set. A configuration snapshot often includes a valid combination of network resources that can be activated. In many implementations, a configuration snapshot is stored as a snapshot object and is usually a read-only object (e.g., a configuration snapshot object). The configuration snapshot object may include all the objects and functions currently in the network from the mobile packet core node down through all the child nodes. Additional details on configuring snapshots are provided below in connection with discussing the figures.

As used herein, an "atomic change" or "atomic commit" refers to an operation that applies a set of distinct changes as a single operation. Additionally, the operation of an atomic change is designed to either fully succeed or fully fail. In other words, either all the changes are applied successfully or, if there is a failure before completion, then all of the changes are reversed back to a previous state. Additionally, an atomic change refers to a coordinated set of changes. For example, the network function configuration system provides for layers of configuration to be added to a pending changes set over time within being implemented, then converted into a configuration snapshot. While the changes are being made and added to the configuration snapshot, the configuration settings may be inconsistent with each other; however, at the end of the changes and upon generating the configuration snapshot, the configuration changes are self-consistent, valid, and can be applied atomically.

Additional details regarding an example implementation of the network function configuration system are discussed in connection with the following figures. For example, FIG. 1 illustrates an example overview of implementing a network function configuration system to facilitate atomic configuration changes to network functions in cloud computing systems of a core network of a telecommunications network according to one or more implementations. As shown, FIG. 1 includes a series of acts 100 where the acts are performed by a network function configuration system in many instances.

To illustrate, the series of acts 100 includes an act 102 of receiving network function changes 112 over time to change network functions of a telecommunications network 114. In many cases, the network function configuration system receives network function changes 112 in the form of API calls. In some instances, one or more users provide several small changes to modify the state of a core network of the telecommunications network 114 from a current or actual state to a desired state. An example of a core network (e.g., a mobile packet core) within a telecommunications network 114 is provided below in connection with FIGS. 3A-3B. Additionally, further details on receiving network function changes are provided below in connection with FIG. 4.

As mentioned earlier, unlike conventional systems, the network function configuration system does not implement changes individually, which was previously highlighted as problematic. Instead, the network function configuration system intelligently stages received changes and applies multiple changes atomically. To illustrate, the series of acts 100 includes an act 104 of generating a pending changes set 116 that incrementally adds the network function changes 112 without immediately applying them to the network functions of the telecommunications network 114. When the network function changes 112 are received, the network function configuration system does not immediately implement them, by adding them to a set of pending changes to be implemented in a batch with other changes.

As the network function changes 112 accumulate and are incrementally added to the pending changes set 116, the pending changes set 116 represents the pending desired state for the telecommunications network 114 such as a core network. This is because the changes are not yet being implemented. In this manner, the network function configuration system provides greater flexibility in the order and preparation required to submit the network function changes 112. Additional details on generating a pending changes set 116 are provided below in connection with FIG. 5.

As shown, the series of acts 100 includes an act 106 of generating a configuration snapshot 118 that includes the network function changes 112 in the pending changes set 116. For example, the network function configuration system generates a configuration snapshot that copies all of the network function changes 112 included in the pending changes set 116. As part of generating the configuration snapshot 118, the network function configuration system can perform various validations and verifications. Additional details on generating a configuration snapshot 118 are provided below in connection with FIG. 6.

The series of acts 100 also includes an act 108 of atomically activating the configuration snapshot 118 across the telecommunications network 114. For instance, the network function configuration system applies the pending desired network function configuration changes to the telecommunications network 114 to bring it to an actual desired state, by implementing and applying the network function changes 112 in the configuration snapshot 118 to nodes and/or network functions in a core network using fanning out and filtering operations. In most implementations, the system atomically applies the configuration snapshot 118, meaning that it either successfully applies every change or does not apply any of the changes. Additional details on activating a configuration snapshot 118 are provided below in connection with FIG. 7.

In some cases, even with the verifications and validations conducted when generating the configuration snapshot 118, issues may arise in the telecommunications network 114 as a result of activating the configuration snapshot 118. In these implementations, the network function configuration system can use the configuration snapshot to revert to a previous network state. To illustrate, the series of acts 100 includes an act 110 of rolling back to a previous configuration snapshot 120 if the telecommunications network 114 fails (or breaks). Additional details on rolling back a telecommunications network 114 to a previous state are provided below in connection with FIG. 8.

Figure 2:
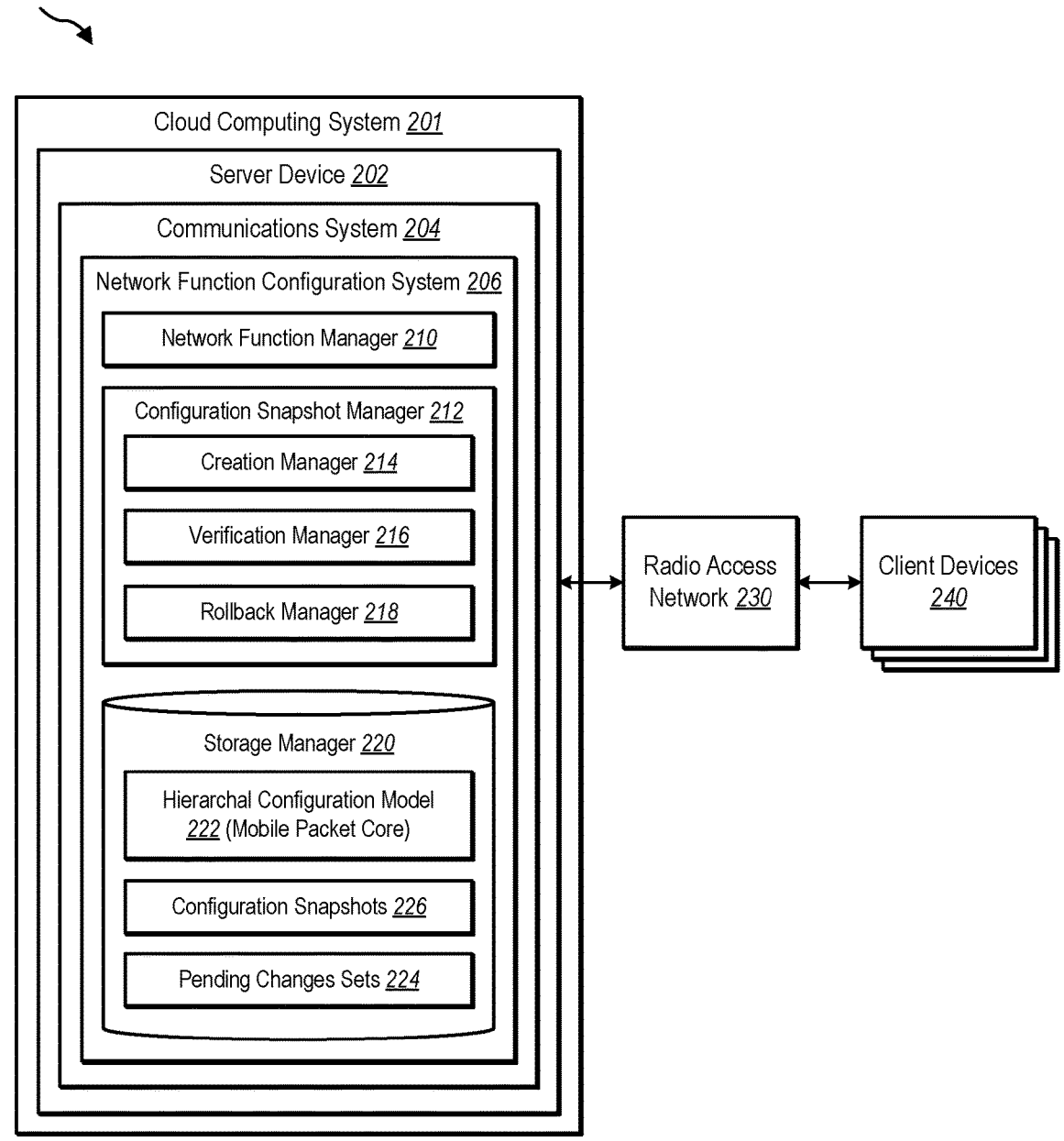
FIG. 2 illustrates an example environment that includes a network function configuration system for managing network functions in a cloud computing system of a core network.

With a general overview of the network function configuration system in place, this next section provides additional details about the components and elements of the network function configuration system. For example. To illustrate, FIG. 2 illustrates an example environment that includes a network function configuration system for managing network functions in a cloud computing system of a core network in accordance with one or more implementations. While FIG. 2 shows one example arrangement and configuration of components, other arrangements and configurations are also possible.

As shown in FIG. 2, there is a computing system environment 200 with a cloud computing system 201, a radio access network 230 (RAN), and client devices 240, all of which are connected in electronic communication. Further details on these and other computing devices are provided below in connection with FIG. 10.

In some instances, the computing system environment 200 is a telecommunications network, such as a public or private cellular network. For example, the computing system environment 200 may be a cellular network that includes the radio access network 230, a core network (e.g., the cloud computing system 201), and a data network (e.g., the Internet or external resources). In some cases, the radio access network 230 is part of a cellular network, such as a 5G network, to which the client devices 240 connect. Components of a core network (e.g., the cloud computing system 201) or the radio access network 230 may be implemented as part of an edge network, datacenter, or at various other locations, depending on the specific implementation of the computing system environment 200.

In one or more implementations, the radio access network 230 includes one or more RAN sites. In some cases, a RAN site includes one or more base stations and associated RAN components. Although the client devices 240 may have components that are entirely separate from the core network, some implementations of the computing system environment 200 may include one or more RAN components or services traditionally offered by a RAN site that are implemented on the cloud computing system 201 (e.g., as part of a core network). For example, while FIG. 2 illustrates the client devices 240 being entirely separate from the cloud computing system infrastructure, the computing system environment 200 may collectively provide services (e.g., physical and/or virtualized functions) that collectively make up a core network, a RAN, or other portions of a telecommunications network.

In various implementations, the client devices 240 include a variety of computing devices and/or device endpoints such as mobile devices (e.g., mobile telephones, smartphones, personal digital assistants (PDAs), tablets, or laptops), and non-mobile devices such as desktop computers, server devices (e.g., edge network servers), or other non-portable devices. In some implementations, the client devices 240 refer more generally to any endpoint capable of communicating with devices on the cloud computing system 201, such as Internet of Things (IoT) devices or other Internet-enabled devices. In one or more implementations, the client devices 240 refer to applications or software constructs on corresponding computing devices.

As mentioned previously, in various implementations, the cloud computing system 201 may be a portion of a telecommunications network. For example, the cloud computing system 201 represents some or all of the core network of a telecommunications network. In some implementations, some or all of the cloud computing system 201 represent a cloud service offers that provides network function services.

As shown in FIG. 2, the cloud computing system 201 includes a server device 202 (made up of one or more server devices) with a communications system 204. In various implementations, the communications system 204 manages the exchange of information between devices, components, and services. For example, the communications system 204 provides data to and from the server device 202 to other service devices, the client devices 240 (via the radio access network 230), or another cloud computing system 201.

As further shown, the server device 202 includes a network function configuration system 206 within the communications system 204. In some instances, the network function configuration system 206 is located outside of the communications system 204. As mentioned, the network function configuration system 206 manages, modifies, updates, adds, removes, and reverts the configurations of network functions within one or more parts of the cloud computing system 201. For example, the network function configuration system 206 manages network functions within a mobile packet core, such as the hierarchical configuration model 222, as discussed below.

As shown in FIG. 2, the network function configuration system 206 includes various components and elements. For example, the network function configuration system 206 includes a network function manager 210 that manages network functions. For example, the network function manager 210 uses a hierarchical configuration model 222 to manage network functions on the nodes of a mobile packet core. In some instances, the network function manager 210 may create, modify, update, and implement a hierarchical configuration model 222 to help manage network functions. For instance, the network function manager 210 receives and processes requests (e.g., API calls) that comply with the hierarchical configuration model 222.

In some implementations, the network function manager 210 (or another part of the network function configuration system 206) may process a request using the hierarchical configuration model 222 by filtering the request, fanning out the request, and performing other acts related to managing network functions referenced by the request across the cloud computing system 201.

In addition, the network function configuration system 206 includes a configuration snapshot manager 212 that manages configuration snapshots 226 with the help of a create manager 214 that creates a configuration snapshot 226 from pending changes sets 224, a verification manager 216 that validates and verifies the configuration snapshots 226, and a rollback manager 218 that rolls back a network to a previous state based on previous versions of the configuration snapshots 226. The network function configuration system 206 also includes a storage manager 220 that stores various pieces of data, including the hierarchical configuration model 222, the pending changes sets 224, and the configuration snapshots 226, which components of the network function configuration system 206 may access to obtain or store information associated with the network function configuration system 206.

Figure 3A:
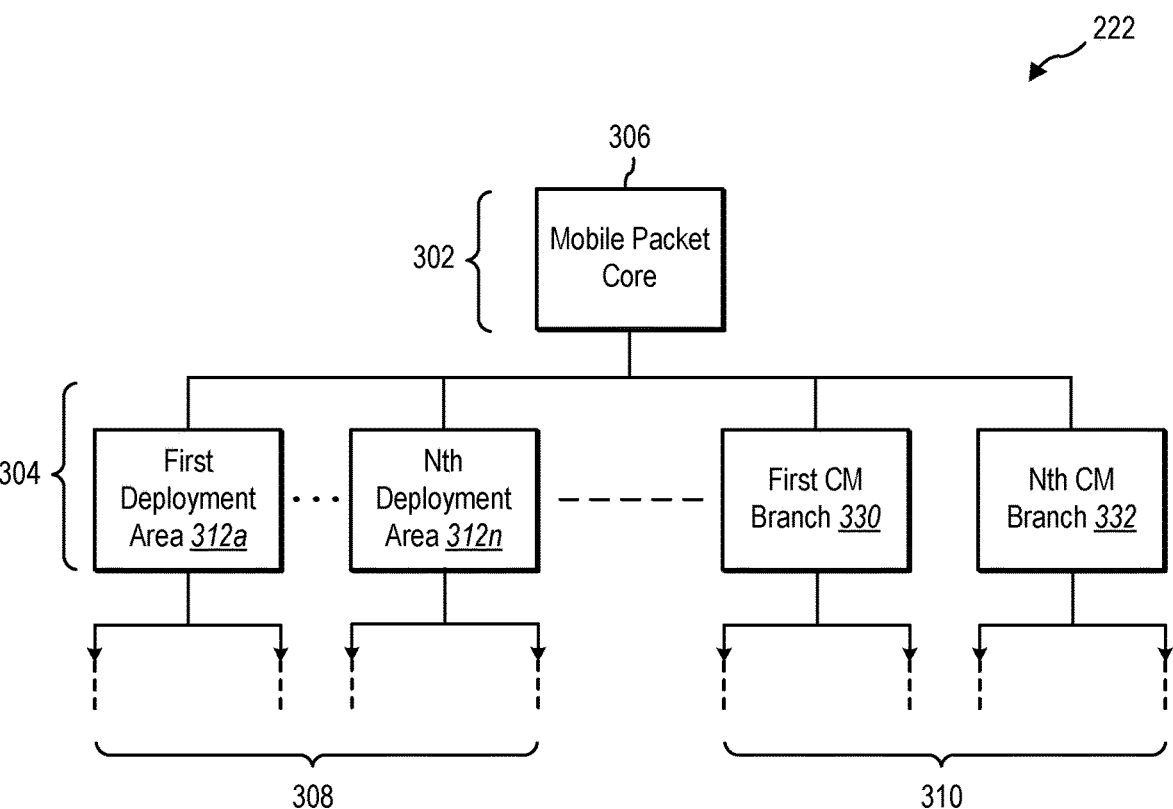
FIGS. 3A-3B illustrate example implementations of a mobile packet core of a cloud computing system of a core network having a hierarchical configuration.
Figure 3B:
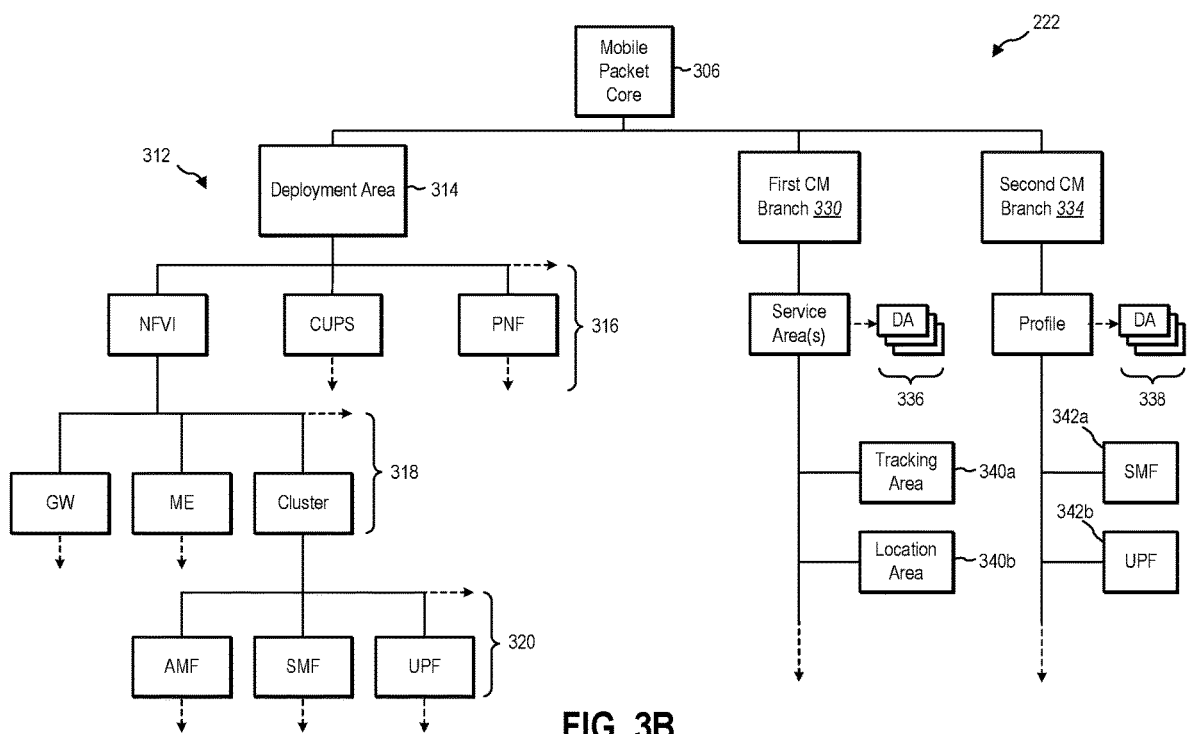

Additional information will now be discussed regarding example implementations of the hierarchical configuration model 222 for managing network functions on a telecommunications network. As mentioned above, FIGS. 3A-3B provide an example of a core network, such as a mobile packet core, within a telecommunications network. Specifically, FIGS. 3A-3B illustrate example implementations of a mobile packet core in a cloud computing system of a core network that has a hierarchical configuration according to one or more implementations. FIG. 3A shows an example of a core network with high-level nodes, while FIG. 3B provides further details on the core network shown in FIG. 3A.

FIG. 3A shows an example of the hierarchical configuration model 222 as representing a mobile packet core that includes multiple levels of nodes that include network functions. The hierarchical configuration model 222 includes first-level nodes 302 and second-level nodes 304. The hierarchical configuration model 222 also includes additional lower levels, which are discussed below in connection with FIGS. 3A and 3B.

As shown in FIG. 3A, the first-level nodes 302 include a top node 306. In one or more implementations described herein, the top node 306 is referred to as a mobile packet core of a core network. In this example, the top node 306 is a base node that serves as a parent node for all branches and lower-level nodes of the hierarchical configuration model 222. Thus, any configuration instructions applied to the top node 306 are applied to each of the nodes branching off of the top node 306. For example, any modification to a policy or configuration instruction applied to the top node 306 will be implemented across all network functions and nodes within the cloud computing system 201. The top node 306 includes configuration instructions that are globally applicable to each type of network function and deployment area included in the hierarchical configuration model 222.

As shown in FIG. 3A, the hierarchical configuration model 222 includes second-level nodes 304 that are children of the top node 306. Each of the second-level nodes 304 may be referred to as a branch of the mobile packet core (or the top node 306). The second-level nodes 304 may include various types of branches, such as deployment area branches 308 that have sets of nodes that have configuration management instructions specifically applicable to defined areas (e.g., geographic areas) of the cloud computing system 201.

As also shown in FIG. 3A, the second-level nodes 304 include deployment area branches 308, such as a first deployment area 312*a* and an Nth deployment area 312*n*. The deployment area branches 308 shown may include any number of deployment area nodes, each with configuration management instructions that apply to network function instances deployed within their respective deployment areas. For example, a first deployment area node may be linked to a first datacenter (or another grouping of server nodes) and include a set of configuration management instructions that apply to any network function deployed in the first datacenter. In this example, the configuration management instructions of the first deployment area node may be implemented in addition to the globally applicable configuration management instructions indicated by the top node 306 (e.g., the mobile packet core). Additional details in connection with example deployment area branches will be discussed below in connection with FIG. 3B.

As also shown in FIG. 3A, the second-level nodes 304 include configuration management branches 310 (CM branches) such as a first configuration management branch 330 and an Nth configuration management branch 332. The configuration management branches 310 may include a set of nodes with configuration management instructions that apply to specific service areas, specific types of network functions, or other groupings of configuration instructions within their respective branches of the hierarchical configuration model 222.

In some cases, the configuration management branches 310 include various configuration management nodes. For example, a first configuration management node applies to a specific grouping of configuration management instructions. Other deployment management nodes may be applicable to other groupings of configuration management instructions. Additional details regarding example configuration management branches will be discussed below in connection with FIG. 3B.

In contrast to the deployment area branches 308, the configuration management branches 310 may not necessarily be associated with a specific deployment area. Rather, the specific nodes of the configuration management branches 310 may include indicators that point to specific deployment areas of the cloud computing system 201 referenced within the hierarchical configuration model 222.

While the examples described in this document relate to a specific example of a hierarchical configuration model 222, the network function configuration system 206 may use different hierarchical configuration models to manage network functions. For example, a first hierarchical configuration model corresponding to a first mobile packet core may be used to process network function change requests from a first set of customers while a second hierarchical configuration model corresponding to a second mobile packet core may be used to process network function change requests from a second set of customers.

Additional details will now be discussed in connection with an example deployment area branch of the hierarchical configuration model 222. For example, FIG. 3B illustrates an example deployment area branch 312 of the hierarchical configuration model 222. As shown in FIG. 3B, the hierarchical configuration model 222 includes the top node 306 introduced above (e.g., the mobile packet core of a core network). The hierarchical configuration model 222 may additionally include a deployment area node 314 having any number of lower-level nodes associated with it. For ease of explanation, FIG. 3B shows a single deployment area branch from multiple deployment area branches included within the hierarchical configuration model 222. Additionally, features and functionalities described in connection with the deployment area branch 312 illustrated may apply to other deployment area branches (as well as configuration management branches).

As shown in FIG. 3B, the deployment area node 314 may include third-level nodes 316. In this example, the third-level nodes 316 may include configuration management instructions applicable to different varieties of network functions. For instance, the third-level nodes 316 may include a network function virtualization infrastructure (NFVI) node associated with virtualized network functions (VNF), a control and user plane separation (CUPS) node, and a physical network function (PNF) node. Each of these nodes may include lower levels of nodes associated with different types of network functions that can be categorized within the respective instances of the third-level nodes 316.

Additionally, as shown, the NFVI node in the third-level 316 may include fourth-level nodes 318 having one or more gateway (GW) nodes, one or more management entities (ME) nodes, and a cluster node. Each of these nodes may include configuration management instructions (e.g., lifecycle management and/or configuration management) that are applicable to network functions of the associated type(s) within the category of NFVI functions in the deployment area.

As a further example, the cluster node may include fifth-level nodes 320 branching therefrom and corresponding to network function types that fall under the cluster (e.g., Kubernetes cluster) category of NFVI network functions. More specifically, the fifth-level nodes 320 may refer to multiple nodes corresponding to types of containerized network functions (CNFs) that are managed by a cluster (e.g., a Kubernetes cluster) in the corresponding deployment area. Examples of the fifth-level nodes may include VNFs and/or CNFs, such as an access and mobility management function (AMF) node, a session management function (SMF) node, a user plane function (UPF) node.

As noted above, the nodes illustrated in FIG. 3B are provided as examples and different deployment area branches may include similar or different branches of nodes corresponding to similar or different types of network functions and associated configurations. For instance, each of the nodes may include configuration instructions that are specific to the deployment area, and which may differ (or be similar) from nodes that reference similar network function types contained in other deployment area branches.

Additional information will now be discussed in connection with an example set of configuration management branches of the hierarchical configuration model 222. For example, FIG. 3B also includes an example of a first configuration management branch 330 and an example of a second configuration management branch 334. As shown, the hierarchical configuration model 222 includes the top node 306 (e.g., the mobile packet core). As also shown, the first configuration management branch 330 (e.g., the service area(s) node) and the second configuration management branch 334 (e.g., the profile node) are child branches of the top node 306. While FIG. 3B illustrates two configuration management nodes, the hierarchical configuration model 222 may include any number of configuration management nodes having corresponding sets of nodes. Additionally, features and functionalities described in connection with the example branches shown in FIG. 3B may apply to other configuration management branches not shown.

In each of the configuration management branches (e.g., the service area(s) node and the profile node), one or more of the nodes that make up the branches may be associated with deployment area indicators that point to one or more deployment areas. For example, a second-level node of the first configuration management branch 330 (e.g., the service area(s) node) may include a first set of indicators 336 corresponding to deployment areas (i.e., DA) that point to one or more deployment branches of the hierarchical configuration model 222. Similarly, a second-level node of the second configuration management branch 334 (e.g., the profile node) may include a second set of indicators 338 corresponding to deployment areas (i.e., DA) that point to one or more deployment branches of the hierarchical configuration model 222. Points to the different deployment area branches may differ between the configuration management branches to serve particular implementations.

In the illustrated example, the first configuration management branch 330 refers to a service area branch. In one or more implementations, the service area branch is associated with a particular service area and may be applied to any set of network functions that fall within a particular service area. As an example, a deployment request may indicate a set of network functions with responsibility over a specific service area (e.g., a RAN coverage area or specified geographic area). This service area may be referenced by a service area node, which may include points to specific deployment branches that are included within the indicated service area.

Additionally, this service area and associated deployment area points may provide a filtering mechanism that instructs the network function configuration system 206 to manage network functions tasked with providing services or resources to deployment areas that fall within the indicated service area while also instructing the network function configuration system 206 to avoid managing network functions at deployment areas that do not fall within the indicated service area.

As further shown in FIG. 3B, the service area node may include one or more lower-level nodes that provide additional configuration management instructions to network functions and other services that fall within the hierarchy of the first configuration management branch 330. For example, a first third-level node in the first configuration management branch 330 may include a tracking area node 340a including tracking area instructions applicable to network functions deployed within the indicated service area (and identified deployment areas). As another example, a second third-level node in the first configuration management branch 330 may include a location area node 340b including location area instructions applicable to network functions deployed within the indicated service area.

While not explicitly shown in FIG. 3B, each of the nodes may include further instructions limiting the application of the configuration management instructions to specific types of network functions in the indicated deployment areas. As an example, a first third-level node (e.g., the tracking area node 340a) may include an instruction limiting application of configuration management instructions of the respective node to a first category of network functions while a second third-level node (e.g., the location area node 340b) may include an instruction limiting application of configuration management instructions of the respective node to a second category of network functions.

As shown in FIG. 3B, the second configuration management branch 334 may refer to a profile branch. Similar to the first configuration management branch 330, the profile branch (and/or individual nodes within the branch) may be associated with one or more deployment areas (DAs). For example, as shown in FIG. 3B, the profile node of the second configuration management branch 334 may include the second set of indicators 338 pointing to one or more corresponding deployment area branches of the hierarchical configuration model 222. Lower-level nodes may similarly include pointers to specific deployment area branches of the hierarchical configuration model 222.

Additionally, the profile node includes lower-level nodes including configuration management functions to be applied to particular profiles of network functions. By way of example, the lower-level nodes may include an SMF profile node 342a including configuration instructions that may be applied to the SMF profile of SMF network functions. As further shown, the lower-level nodes may include a UPF profile node 342b including configuration instructions that may be applied to the UPF profile of UPF network functions.

The above configuration management branches are provided by way of example and are not intended to be limiting in scope to the specific types of configuration management instructions described and illustrated herein. For example, additional configuration management branches may include routing configuration branches, 3G branch protocols, 4G branch protocols, 5G branch protocols, network slice branches, and any other branches that may provide specific configuration management instructions that may be applied to network functions in various deployment areas.

As noted above, each of the nodes of the hierarchical configuration model 222 may be modified over time based on changing computational requirements, security policies, or the addition of new network function types that may be deployed by the network function configuration system 206 in a configuration snapshot. Moreover, one or more nodes may be removed or added to provide a dynamic telecommunications network on the cloud computing system 201 with services that can be enhanced and expanded over time within the framework provided by the hierarchical configuration model 222.

Additional information will now be provided with respect to the network function configuration system 206 facilitating atomic configuration changes to network functions in cloud computing systems of a core network.

As mentioned above, FIG. 4 provides additional details on receiving network function changes. In particular, FIG. 4 illustrates an example process for receiving network function changes for network functions in a cloud computing system of a core network according to one or more implementations. As shown, FIG. 4 includes the act 102 of receiving network function changes 112 over time for changing network functions of a telecommunications network 114, which was briefly introduced in FIG. 1.

As shown in FIG. 4, the act 102 includes a sub-act 402 of maintaining a telecommunications network 114 having network functions operating in a current state. For example, the telecommunications network 114 includes a current set of network function configurations within a mobile packet core running in an active current state.

In some instances, the active current state is based on a previous desired state from implementing a previous configuration snapshot. For example, upon generating a mobile packet core having a hierarchical configuration model 222 by providing a series of network function configuration settings (e.g., network function changes), the network function configuration system 206 generates a first configuration snapshot (e.g., Snapshot 1) to the network function configuration settings of the newly created core network.

In this example, Snapshot 1 reflects the previous desired state/active current state, which may not be the desired state. Accordingly, the network function configuration system 206 enables a user to change the core network from the current state to a desired state using a configuration snapshot (e.g., by building and implementing Snapshot 2).

As also shown, the act 102 includes a sub-act 404 of receiving network function changes over time to modify the current network functions. For instance, the network function configuration system 206 receives several changes in the form of API calls that modify network functions. Some example API calls include instantiating a given policy rule, enabling a given feature, modifying a given policy rule, adding a given data network name (DNN) on a 5G network, adding a new network slice, removing a network function, adding a new network function, and disabling a given feature. Indeed, the network function configuration system 206 receives API calls that create, update, or delete network functions or portions thereof. In some implementations, the network function configuration system 206 receives network function changes using a different protocol type.

Indeed, the network function configuration system 206 receives one or more, often several, small changes for modifying the state of the core network from the active current state to a desired state. Additionally, the network function configuration system 206 receives these changes incrementally over a period of time. In many instances, the time period corresponds to the duration of time between configuration snapshot creation.

Figure 5:
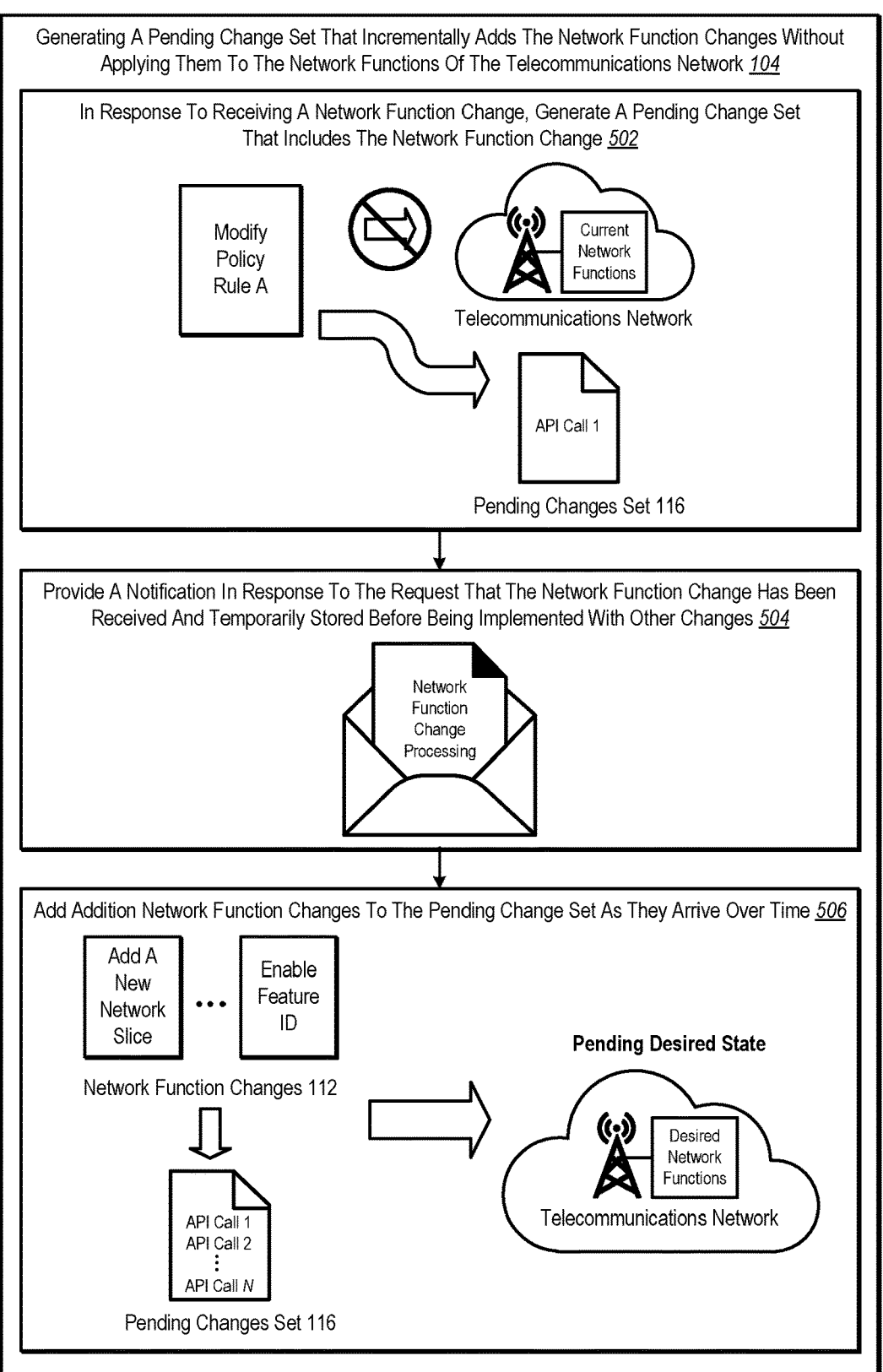
FIG. 5 illustrates an example process for generating a pending changes set of network function changes.

As mentioned above, FIG. 5 provides additional details on generating a pending changes set 116. In particular, FIG. 5 illustrates an example process for generating a pending changes set of network function changes according to one or more implementations. As shown, FIG. 5 includes the act 104 of generating a pending changes set 116 that incrementally adds the network function changes 112 without applying them to the network functions of the telecommunications network 114, which was briefly introduced in FIG. 1.

As shown, the act 104 includes a sub-act 502 of, in response to receiving a network function change, generating a pending changes set 116 that includes the network function change. For example, when the network function configuration system 206 receives a new network function change, rather than immediately applying it to the telecommunications network 114, the network function configuration system 206 creates a pending changes set 116 and stores the network function change in it. In this way, the network function configuration system 206 creates a staging area for incoming requests as they accumulate.

In various implementations, the pending changes set 116 is a collection of resources stored in a data structure, such as a table, database, list, queue, digital bucket, or other data store that maintains a collection of pending changes set 116 as they arrive. In some instances, the pending changes set 116 includes a valid combination of resources that enables the core network to converge towards a desired goal state when the changes are activated.

In various implementations, the pending changes set 116 includes the network function changes 112 in the order in which they arrive. In some implementations, the network function changes are stored by identifier or alphabetically. In certain implementations, the network function changes 112 are organized differently in the pending changes set 116.

As shown, the act 104 includes a sub-act 504 of providing a notification in response to the request that the network function change has been received and temporarily stored before being implemented with other changes (e.g., the network function changes 112). For instance, in response to the API call with the change, the network function configuration system 206 generates and provides a response that acknowledges receipt of the request. In some implementations, the network function configuration system 206 generates a single response that indicates the receipt of multiple requests.

Additionally, in various instances, the network function configuration system 206 indicates in the same or a different response that the received change is pending and is to be implemented in a batch with other changes. In some instances, the indication notifies the requestor that they can make other changes that will be implemented in the same batch. In various implementations, the response allows the user to initiate the batch of changes by generating a configuration snapshot, as further discussed below.

As shown, the act 104 includes a sub-act 506 of adding additional network function changes to the pending changes set 116 as they arrive over time. For example, while awaiting the creation of a new configuration snapshot, the network function configuration system 206 adds incoming network function changes to the pending changes set 116. In this way, the network function configuration system 206 beings to accumulate a collection of changes that represents a pending desired state of the core network (e.g., a goal state for the whole network).

Figure 6:
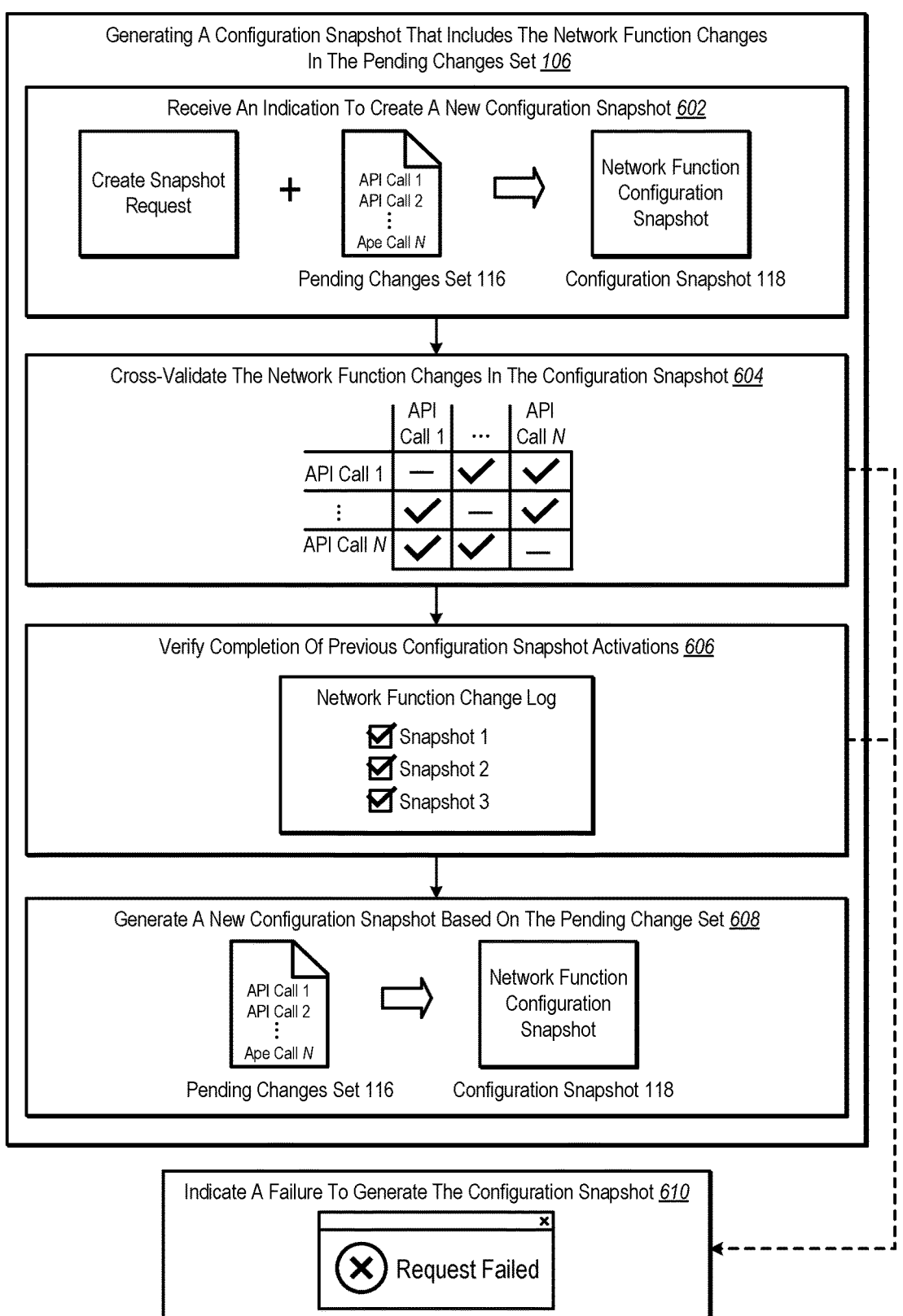
FIG. 6 illustrates an example process for generating a configuration snapshot for updating network functions in a cloud computing system of a core network.

As mentioned above, FIG. 6 provides additional details on generating a configuration snapshot 118. In particular, FIG. 6 illustrates an example process for generating a configuration snapshot to update network functions in a cloud computing system of a core network according to one or more implementations. As shown, FIG. 6 includes the act 106 of generating a configuration snapshot 118 that includes the network function changes 112 in the pending changes set 116, which was briefly introduced in FIG. 1.

As shown, the act 106 includes a sub-act 602 of receiving an indication to create a new configuration snapshot. For example, the network function configuration system 206 receives a snapshot creation request to generate a configuration snapshot 118. In one or more implementations, by receiving a snapshot creation request, the network function configuration system 206 acknowledges that no further changes will be added to the configuration snapshot 118.

In various implementations, the network function configuration system 206 generates the configuration snapshot 118 at the mobile packet core of the core network. By generating and activating a configuration snapshot at the mobile packet core, all the child nodes will receive the network function changes and, where appropriate, be affected by the configuration snapshot 118.

In some instances, a user submits the snapshot creation request via an API call (or using another protocol). For example, the network function configuration system 206 receives an HTTP Post action in an API call to create a configuration snapshot object at the mobile packet core and commit all the changes in the pending changes set 116. In this manner, the network function configuration system 206 utilizes the configuration snapshot 118 to take all the resources (e.g., network function changes) that have accumulated in the pending changes set 116 (i.e., the pending desired state) and follows the request to activate them as a group to change the core network to an actual desired state, which is further discussed in the next figure.

In some implementations, the network function configuration system 206 provides the user with an interactive interface that reports information such as the time of the last configuration snapshot and the number of network function changes in the pending changes set 116. In various implementations, the interactive interface includes an option to initiate a new configuration snapshot. For instance, the interactive interface alerts the user to initiate a configuration snapshot based on one or more factors (e.g., the number of changes and/or elapsed time since the last configuration snapshot).

In response, the network function configuration system 206 can generate a configuration snapshot 118 from the pending changes set 116. For example, the network function configuration system 206 moves all of the network function changes and/or resources within the pending changes set 116 to a configuration snapshot 118.

As mentioned above, in some implementations, the network function configuration system 206 generates a resource called a configuration snapshot object in response to a request to create a configuration snapshot. In various implementations, the configuration snapshot object includes all of the contents of the core network (e.g., the objects and network functions) from the mobile packet core downward (e.g., including child objects). In many instances, the configuration snapshot object is stored as a large read-only object or resource, that provides read access in response to API calls.

In various implementations, the configuration snapshot object includes the network function configurations of network functions corresponding to changes in the pending changes set 116. In alternative implementations, the configuration snapshot object includes the network function configurations of all network contents currently in the core network with the addition of the network function changes in the pending changes set 116. In a few implementations, the network function configuration system 206 creates a configuration snapshot that captures the current state of the core network (e.g., current network function configuration settings) before the network function changes are applied.

As shown, the act 106 includes the sub-act 604 of cross-validating the network function changes 112 in the configuration snapshot. In various implementations, as part of generating a configuration snapshot 118, the network function configuration system 206 ensures that the network function changes 112 included in the snapshot do not conflict with each other. Indeed, the network function configuration system 206 may reject the configuration snapshot 118 if there are inconsistencies. Accordingly, in some instances, the network function configuration system 206 cross-validates each network function changes 112 to identify conflicts.

In various implementations, if a conflict is detected, the network function configuration system 206 may perform the act 610 of indicating a failure to generate the configuration snapshot, as shown in FIG. 6. In additional implementations, the network function configuration system 206 indicates a reason for the failure (e.g., the conflicting network function changes). In some instances, the network function configuration system 206 also allows for the correction of a conflict, such as modifying or removing one of the network function changes 112.

In general, when a network function change is received as part of a request, the network function configuration system 206 individually validates the change. However, in many instances, the network function configuration system 206 does not cross-validate the change against the other pending changes in the pending changes set 116 and instead waits for the creation of a configuration snapshot 118 (or at another designated time).

To elaborate, as mentioned above, the network function configuration system 206 provides increased flexibility by allowing network function changes 112 to be implemented in batches. For example, a user provides a first API call that references a resource that will be created in a second API call. In this way, the network function configuration system 206 allows for incomplete referenced resources (e.g., dangling references), intermediate states, and intermediate dependences to temporarily exist while adding changes to the pending changes set 116, before generating a configuration snapshot 118. Indeed, the network function configuration system 206 accumulates pending changes, then performs a validation when ready.

As mentioned above, cross-validation occurs upon creating a configuration snapshot 118 and not with the addition of each new network function change. In some implementations, the network function configuration system 206 performs cross-validation periodically. In these implementations, the network function configuration system 206 may report the results of the cross-validation check.

In addition to performing validations, the network function configuration system 206 may perform a snapshot verification. To illustrate, FIG. 6 shows that the act 106 includes a sub-act 606 of verifying the completion of previous configuration snapshot activations. To ensure that requested changes are not lost, in many instances, the network function configuration system 206 ensures that a previous configuration snapshot completes processing before a new configuration snapshot may be created. For example, if changes arrive when implementing a current configuration snapshot, the changes are added to a new pending changes set corresponding to a future configuration snapshot.

To elaborate, when a configuration snapshot is created and activated (as further described below), the rollout process may take some time to complete. Accordingly, if during the rollout, a user provides new network function changes (e.g., stored in a new pending changes set) along with a request that a new configuration snapshot be created and activated, implementing the new snapshot across the core network may conflict with the current rollout of the previous snapshot, cause issues or errors in the core network. Accordingly, the network function configuration system 206 indicates to the user that the new snapshot must wait until the previous snapshot completes (or for the previous snapshot to time out) and that the new network function changes will remain in the new pending changes set. In some implementations, the network function configuration system 206 may automatically create the new configuration snapshot once the completion of the previous snapshot is detected.

In some implementations, the network function configuration system 206 determines that the network function changes to be included in the network configuration snapshot do not conflict with those in the previous snapshot. In these instances, the network function configuration system 206 may create the new configuration snapshot before the previous configuration snapshot has finished being implemented across the core network. Indeed, the network function configuration system 206 can create the new configuration snapshot and convert the core network from its current transient state to that provided in the new configuration snapshot.

As shown in FIG. 6, if the verification is successful (along with the validation), the network function configuration system 206 can advance to the sub-act 608 of generating a new configuration snapshot based on the pending changes set 116. Otherwise, if the verification is unsuccessful, the network function configuration system 206 performs the act 610 of indicating a failure to generate the configuration snapshot, as discussed above. For example, the network function configuration system 206 reports the reason for failure to the user and allows the user to fix issues before requesting a new configuration snapshot be generated.

Upon creating a configuration snapshot, the network function configuration system 206 can activate or implement the snapshot across the core network. As mentioned above, FIG. 7 provides additional details on activating a configuration snapshot. In particular, FIG. 7 illustrates an example process for atomically activating a configuration snapshot for network functions across a cloud computing system of a core network according to one or more implementations. As shown, FIG. 7 includes the act 108 of atomically activating the configuration snapshot 118 across the telecommunications network 114, which was briefly introduced in FIG. 1.

As shown, the act 108 includes a sub-act 702 of determining an implementation order for activating the configuration snapshot 118. For example, the network function configuration system 206 reorganizes the network function changes 112 from the pending changes set 116 to optimize rolling out the change. In many instances, the network function configuration system 206 organizes the configuration snapshot 118 based on network function policies.

To illustrate, in some implementations, the network function configuration system 206 groups related change together, such as grouping network function change for network functions having the same network function type. For example, if there are 20 session management functions (SMFs) changes and 40 user plane functions (UPFs) changes, the network function configuration system 206 identifies and groups the SMFs changes together as one group to be rolled out, and the UPFs changes together as another grouped to be rolled out, often at a separate rollout stage.

In some implementations, the network function configuration system 206 determines if customizations need to occur on a per-instance basis. For example, while some of the 20 SMFs changes are the same in the above example, the first SMF change may differ from the second and third SMF changes. In this manner, the network function configuration system 206 may identify and customize the implementation order within the SMFs group (or within another group).

In some implementations, the network function configuration system 206 forms groups based on when which network function changes are related. For example, the network function configuration system 206 determines changes that are related to or form a chain (e.g., where implementation order matters). In these implementations, the network function configuration system 206 groups and orders the changes accordingly.

Indeed, the network function configuration system 206 may determine an implementation order that provides a safe deployment of the changes across the core network. As part of the implementation order, the network function configuration system 206 may use one or more network function policies to determine how many groups to create and roll out stages for each of the groups to be activated and/or whether to implement two or more changes incrementally (e.g., serially) or in parallel.

In some implementations, before pushing out the changes, the network function configuration system 206 performs a dry run test. To illustrate, the act 108 in FIG. 7 includes a sub-act 704 of simulating activation of the configuration snapshot 118 across the telecommunications network 114. For example, the network function configuration system 206 simulates one or more portions of implementing the network function changes across the core network. While the simulated activation is described in connection with the actual activation, the network function configuration system 206 may perform the simulated activation at any time, such as upon user request.

In various implementations, the simulated activation includes the network function configuration system 206 performing a validation check. For example, as noted above, the network function configuration system 206 verifies that the network function changes 112 in a configuration snapshot do not conflict with each other. In some instances, the validation check also revalidates one or more of the individual changes to ensure that they are valid (e.g., the network function they are modifying is still available).

In one or more implementations, the simulated activation includes simulated filter and fan-out operations. For instance, the network function configuration system 206 filters the rollout to a subset of network function types, nodes, and/or components within the core network and fans out the rollout by repeating the activation of changes across multiple subsets and/or instances of network functions.

Additionally, the network function configuration system 206 can report the status of the simulated rollout. For example, the network function configuration system 206 provides the results of the filtering and fanout operations of the potential configuration snapshot. In some instances, the report includes what changes occurred in the core network and where they occurred, such as what changes were pushed out to which elements, if the elements accepted the changes, new network functions created or removed, time taken to implement the roll out to a portion or all of the core network, the number of network functions affected, among other examples.

In various implementations, the simulated activation includes an interactive interface that allows a user to proceed with the actual activation of the configuration snapshot 118, to update one or more changes in the configuration snapshot, to delay changes (e.g., move some changes to a new pending changes set corresponding to a future configuration snapshot), or cancel the configuration snapshot.

In some implementations, the network function configuration system 206 performs the simulated activation according to the implementation order. In other instances, the network function configuration system 206 does not follow the implementation order. In various implementations, the network function configuration system 206 does both and reports a status comparison to the user. Similarly, in some implementations, the network function configuration system 206 may run simulated activations of different implementation orders and report back (and/or automatically select) the optimal implementation order for the actual rollout.

As also shown, the act 108 includes a sub-act 706 of activating the configuration snapshot 118 by rolling it out to the network functions. For example, the network function configuration system 206 provides (or activates within) the pending changes set 116 in one or more bulk batches to one or more mobile packet core nodes, which propagates the changes to other network functions in child nodes throughout the core network. By performing the activation operation, the network function configuration system 206 changes the state of a core network from the current network state to the active desired state (e.g., the pending desired state, when applied to the core network, becomes the actual desired state).

As mentioned above, in various implementations, the network function configuration system 206 utilizes fan-out and filter operations to activate the configuration settings to network function of various types. For instance, for network functions of a given type, the network function configuration system 206 filters out particular instances that require unique configuration setting. In some implementations, the filtering operations is an exclusion-based operation that identifies unique instances of network functions based on a combination of factors, such as network function type, network function location, deployment area (or a grouping of locations), and/or other characteristics. The network function configuration system 206 then fans out the configuration changes appropriately, including providing the unique configuration settings to the particular network functions.

As mentioned above, in various instances, activating a configuration snapshot on a cloud computing system may take some time to complete depending on a number of factors. For example, the time duration of an activation is based on the size of the configuration snapshot, the number of changes, the number of rollout stages, whether individual or group status confirmations from changed network functions are required, and whether network tests are to be performed, among others. Another factor may be reconciliation, which is discussed next.

As shown, the act 108 includes a sub-act 708 of performing reconciliation to ensure the actual desired state becomes the actual real state. For example, while the network function configuration system 206 applies the changes that represent the pending desired state to the core network to have it transition to the active desired state, the network function configuration system 206 uses reconciliation to have the core network stabilize at an actual real state.

When activating the configuration snapshot, the actual pending state may initially not match the changes included in the pending desired state. Accordingly, the network function configuration system 206 may use reconciliation to discover and remedy discrepancies. In various implementations, the network function configuration system 206 employs a two-stage or two-level reconciliation process.

To illustrate, the two-level reconciliation process includes a first level of ensuring the network function changes in the configuration snapshot were delivered to the appropriate destination network functions within the cloud computing systems. If not, the network function configuration system 206 can attempt to redeliver. The second level verifies that the changes are committed within their corresponding network elements such that each element matches its desired state. Otherwise, the network function configuration system 206 commits the change to the network element.

In one or more implementations, the two-level reconciliation process is performed at the end of activating a configuration snapshot. In some implementations, the two-level reconciliation process is performed at each rollout stage for network elements (e.g., network functions) included in the rollout stage. In some implementations, the network function configuration system 206 does both (or performs the two-level reconciliation process multiple times across different coverage sizes).

Upon completing the activation of a configuration snapshot, the state of the core network becomes the actual real state, which is often a stable network state. When gathering a new set of changes, the core network state can again be viewed as the current state and/or a previous desired state, and the process of generating a new desired state via a configuration snapshot repeats.

Figure 8:
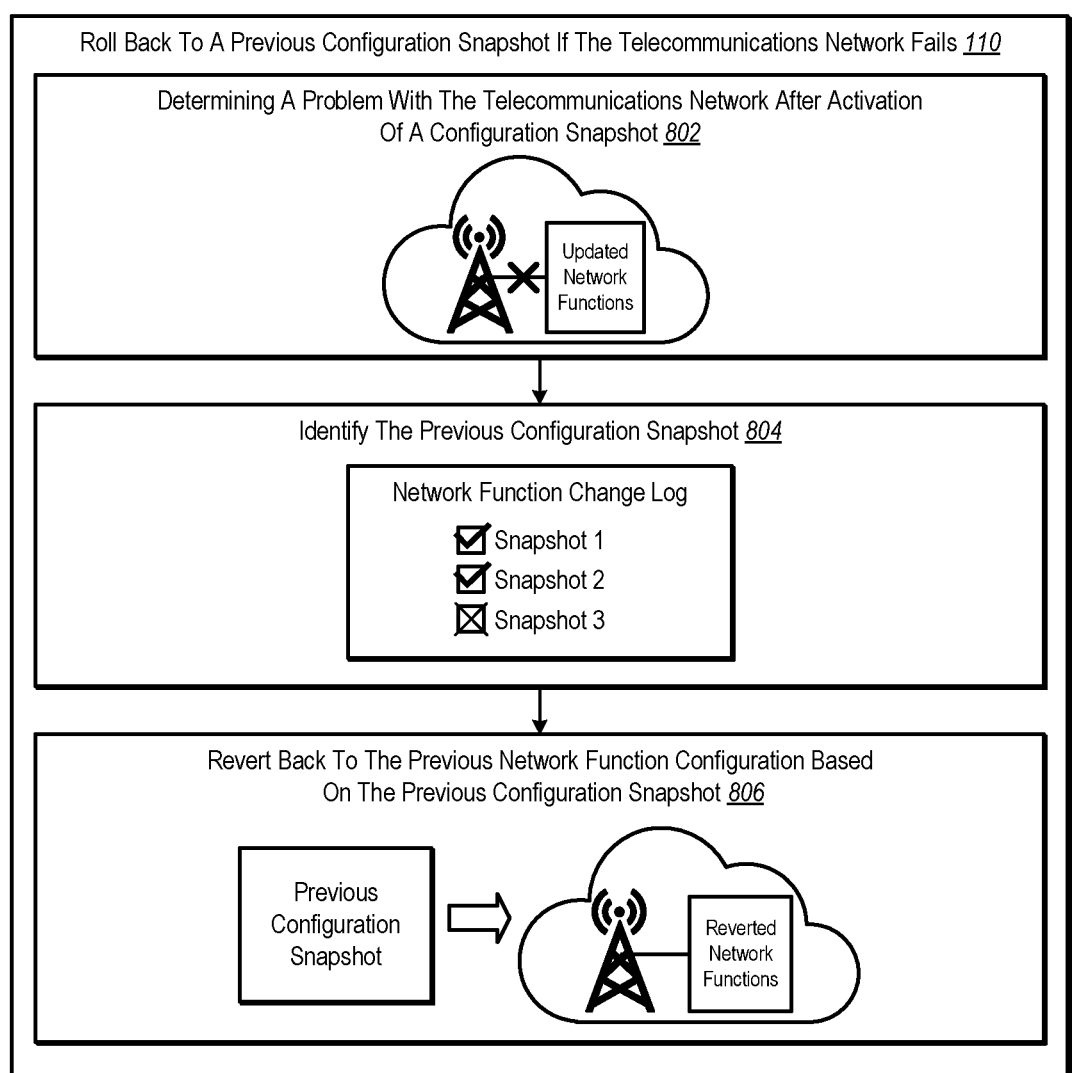
FIG. 8 illustrates an example process for rolling back network functions in a cloud computing system of a core network to a previous configuration snapshot.

In many instances, the cloud computing system operates as intended. In some instances, however, unintended issues arise upon activating a configuration snapshot. In these instances, the network function configuration system 206 may revert to a previous stable state, which is discussed next As mentioned above, FIG. 8 provides additional details on rolling back a telecommunications network 114 to a previous state. In particular, FIG. 8 illustrates an example process for rolling back network functions in a cloud computing system of a core network to a previous configuration snapshot according to one or more implementations. As shown, FIG. 8 includes the act 110 of rolling back to a previous configuration snapshot 120 if the telecommunications network 114 fails, which was briefly introduced in FIG. 1.

As shown, the act 110 includes a sub-act 802 of determining a problem with the telecommunications network 114 after activation of a configuration snapshot 118. For example, the network function configuration system 206 determines that one or more of the changes incorrectly references an external service (e.g., a fully-qualified domain name (FQDN) of the UDM function).

In one or more implementations, the network function configuration system 206 receives reports of errors or issues in the cloud computing systems that correspond to recent network function changes. In one implementation, another system, such as a communications system reports the errors. In another implementation, errors are detected and/or reported by users (e.g., an administrator or end user).

As shown, the act 110 includes a sub-act 804 of identifying a previous configuration snapshot. For example, the network function configuration system 206 accesses and identifies one or more configuration snapshot objects corresponding to previously generated configuration snapshots. In some instances, these objects are stored within the mobile packet core of the configuration snapshot. In other instances, these objects are stored elsewhere. Upon identifying the previous configuration snapshots, the network function configuration system 206 selects one of them, often the most recent configuration snapshot before the error-based snapshot.

FIG. 8 also shows that the act 110 includes a sub-act 806 of reverting back to the previous network function configuration based on the previous configuration snapshot. For example, in various implementations, the network function configuration system 206 rolls out the previous configuration snapshot and re-applies its changes across the cloud computing systems. In some implementations, the network function configuration system 206 utilizes the previous configuration snapshot to identify and undo the changes made from the error-based snapshot last implemented. In this way, the network function configuration system 206 rolls back the cloud computing systems (e.g., the core network) to a previous stable state.

In some implementations, the network function configuration system 206 allows a user to fix and reapply the error-based snapshot. In alternative implementations, the network function configuration system 206 reverts the changes in the error-based snapshot back into a pending changes set and requires a new configuration snapshot to be created.

Turning now to FIG. 9, this figure illustrates an example flowchart that includes a series of acts 900 for utilizing the network function configuration system 206 in accordance with one or more implementations. In particular, FIG. 9 illustrates an example series of acts for managing network functions in a core network that may reside on a cloud computing system of a core network in accordance with one or more implementations. In various implementations, the core network includes a fifth-generation (5G) mobile packet core of a telecommunications network and/or the mobile packet core is a virtualized fifth-generation (5G) mobile packet core. In some implementations, the series of acts 900 includes managing network functions (e.g., VNFs or CNFs) in the mobile packet core of a telecommunications network.

While FIG. 9 illustrates acts according to one or more implementations, alternative implementations may omit, add to, reorder, and/or modify any of the acts shown. Further, the acts of FIG. 9 can be performed as part of a method (e.g., a computer-implemented method). Alternatively, a non-transitory computer-readable medium can include instructions that, when executed by a processing system comprising a processor, cause a computing device to perform the acts of FIG. 9. In still further implementations, a system (e.g., a processing system comprising a processor) can perform the acts of FIG. 9.

As shown, the series of acts 900 includes an act 910 of receiving multiple network function changes for a telecommunications network. For instance, in example implementations, the act 910 includes receiving, across multiple requests, multiple network function changes to modify the network functions of the telecommunications network. In various implementations, the act 910 includes receiving, multivariate time series data from one or more data sources.

In one or more implementations, the act 910 includes receiving, across multiple application programming interface (API) calls, multiple network function changes to modify the network functions of the mobile packet core over a time period. In some implementations, the act 910 includes receiving the multiple network function changes in separate application programming interface (API) calls across the multiple requests. In various instances, a network function change includes an API call to create, update, or delete a network function within the mobile packet core.

As further shown, the series of acts 900 includes an act 920 of adding the network function changes incrementally to a pending changes set. For instance, in example implementations, the act 920 involves adding the multiple network function changes incrementally to a pending changes set without applying the multiple network function changes to the telecommunications network.

In one or more implementations, the act 920 includes adding the multiple network function changes incrementally to a pending changes set without applying the multiple network function changes to the mobile packet core. In various implementations, the act 920 includes acknowledging receipt of a network function change by providing an acknowledgment that indicates that the network function change is being added to the pending changes set for future implementation.

As shown further, the series of acts 900 includes an act 930 of generating a configuration snapshot that includes the network function changes. For instance, in example implementations, the act 930 involves generating a configuration snapshot that includes the multiple network function changes in the pending changes set. In various implementations, the act 930 includes cross-validating the multiple network function changes against each other in the pending changes set.

In one or more implementations, the act 930 includes generating a configuration snapshot that includes the multiple network function changes added to the pending changes set based on receiving a configuration snapshot creation command. In some implementations, the act 930 includes determining an implementation order for the multiple network function changes in the configuration snapshot. In some instances, the implementation order is based on a set of network function policies and/or grouping network function types corresponding to the multiple network function changes.

In some implementations, the act 930 includes validating a network function change being added to the pending changes set and/or waiting to cross-validate the network function change against other network function changes in the pending changes set before generating the configuration snapshot. In various implementations, the act 930 includes determining an implementation order for the multiple network function changes in the configuration snapshot, atomically implementing the multiple network function changes across the telecommunications network based on the implementation order of the configuration snapshot, detecting a failure of a network function change during the implementation of the multiple network function changes across the telecommunications network, and reverting the telecommunications network to a previous state before the configuration snapshot based on the failure.

As further shown, the series of acts 900 includes an act 940 of activating the configuration snapshot by implementing the multiple network function changes across the telecommunications network. For instance, in example implementations, the act 940 involves activating the configuration snapshot across the telecommunications network by implementing the multiple network function changes in the pending changes set atomically to ensure all of the multiple network function changes successfully implement. In one or more implementations, the act 940 includes atomically implementing the multiple network function changes in the mobile packet core based on the implementation order of the configuration snapshot. In various implementations, the atomic implementation ensures all of the multiple network function changes successfully implement. In some instances, the act 940 includes activating a network function change within an edge virtualization node of the telecommunications network.

In some implementations, the act 940 includes atomically implementing the multiple network function changes in a mobile packet core based on the telecommunications network. In various implementations, the act 940 includes performing a simulated network activation of the configuration snapshot that cross-validates the multiple network function changes in the configuration snapshot and indicates how the multiple network function changes will affect the network functions of the telecommunications network before activating the configuration snapshot. In some instances, network function changes that occur to the mobile packet core propagate to nodes that branch off from a mobile packet core node.

In some implementations, the series of acts 900 includes additional acts. For example, the series of acts 900 includes the acts of determining that activating the configuration snapshot across the telecommunications network causes a network error after the configuration snapshot has been implemented and, based on detecting the network error, rolling back the network functions in the telecommunications network to a previous state based on a previous configuration snapshot.

Figure 10:
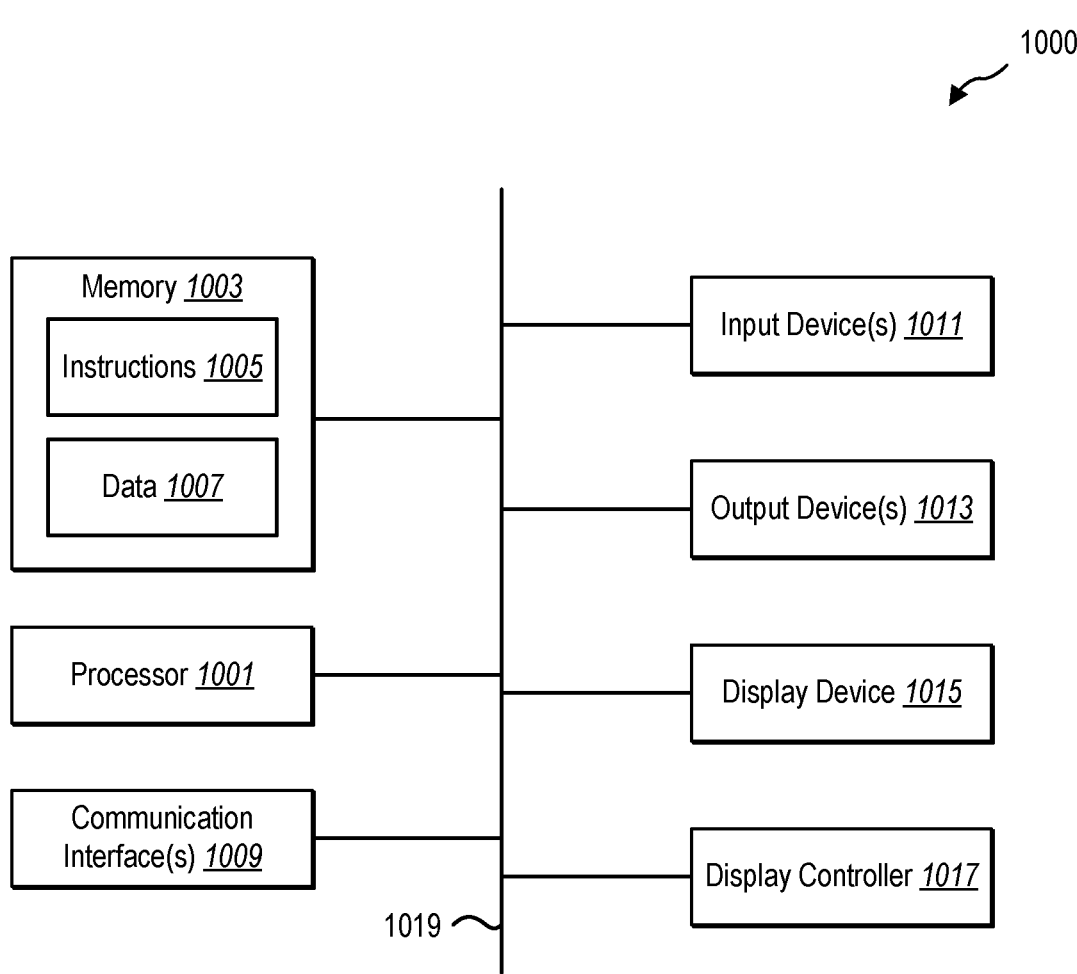
FIG. 10 illustrates certain components that may be included within a computer system.

FIG. 10 illustrates certain components that may be included within a computer system 1000. The computer system 1000 may be used to implement the various computing devices, components, and systems described herein. As used herein, a "computing device" refers to electronic components that perform a set of operations based on a set of programmed instructions. Computing devices include groups of electronic components, client devices, server devices, etc.

In various implementations, the computer system 1000 represents one or more of the client devices, server devices, or other computing devices described above. For example, the computer system 1000 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 1000 includes a processing system including a processor 1001. The processor 1001 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 1001 may be referred to as a central processing unit (CPU). Although the processor 1001 shown is just a single processor in the computer system 1000 of FIG. 10, in an alternative configuration, a combination of processors (e.g., an ARM and DSP) could be used.

The computer system 1000 also includes memory 1003 in electronic communication with the processor 1001. The memory 1003 may be any electronic component capable of storing electronic information. For example, the memory 1003 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 1005 and the data 1007 may be stored in the memory 1003. The instructions 1005 may be executable by the processor 1001 to implement some or all of the functionality disclosed herein. Executing the instructions 1005 may involve the use of the data 1007 that is stored in the memory 1003. Any of the various examples of modules and components described herein may be implemented, partially or wholly, as instructions 1005 stored in memory 1003 and executed by the processor 1001. Any of the various examples of data described herein may be among the data 1007 that is stored in memory 1003 and used during the execution of the instructions 1005 by the processor 1001.

A computer system 1000 may also include one or more communication interface(s) 1009 for communicating with other electronic devices. The one or more communication interface(s) 1009 may be based on wired communication technology, wireless communication technology, or both. Some examples of the one or more communication interface(s) 1009 include a Universal Serial Bus (USB), an Ethernet adapter, a wireless adapter that operates in accordance with an Institute of Electrical and Electronics Engineers (IEEE) 1002.11 wireless communication protocol, a Bluetooth® wireless communication adapter, and an infrared (IR) communication port.

A computer system 1000 may also include one or more input device(s) 1011 and one or more output device(s) 1013. Some examples of the one or more input device(s) 1011 include a keyboard, mouse, microphone, remote control device, button, joystick, trackball, touchpad, and light pen. Some examples of the one or more output device(s) 1013 include a speaker and a printer. A specific type of output device that is typically included in a computer system 1000 is a display device 1015. The display device 1015 used with implementations disclosed herein may utilize any suitable image projection technology, such as liquid crystal display (LCD), light-emitting diode (LED), gas plasma, electroluminescence, or the like. A display controller 1017 may also be provided, for converting data 1007 stored in the memory 1003 into text, graphics, and/or moving images (as appropriate) shown on the display device 1015.

The various components of the computer system 1000 may be coupled together by one or more buses, which may include a power bus, a control signal bus, a status signal bus, a data bus, etc. For clarity, the various buses are illustrated in FIG. 10 as a bus system 1019.

In addition, the network described herein may represent a network or a combination of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the network function configuration system 206. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by a processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A method for managing network functions in a fifth-generation (5G) mobile packet core of a telecommunications network, the method comprising:
   receiving, across multiple requests, multiple network function changes to modify the network functions of the telecommunications network;
   adding the multiple network function changes incrementally to a pending changes set without applying the multiple network function changes to the telecommunications network;
   generating a configuration snapshot that includes the multiple network function changes in the pending changes set, wherein generating the configuration snapshot includes, prior to implementing the multiple network function changes represented within the configuration snapshot, cross-validating the multiple network function changes against each other in the pending changes set; and
   activating the configuration snapshot across the telecommunications network in a single operation, such that the multiple network functions transition as a batch of network functions from a current state of a plurality of network functions to the desired state across all network functions of the plurality of network functions by implementing the multiple network function changes in the pending changes set atomically to ensure all of the multiple network function changes successfully implement.

2. The method of claim 1, wherein receiving the multiple network function changes includes receiving the multiple network function changes in separate application programming interface (API) calls across the multiple requests.

3. The method of claim 1, wherein activating the configuration snapshot comprises activating a network function change within an edge virtualization node of the telecommunications network.

4. The method of claim 1, further comprising:
   validating a given network function change being added to the pending changes set; and
   waiting to cross-validate the given network function change against other network function changes in the pending changes set before generating the configuration snapshot.

5. The method of claim 1, further comprising, before activating the configuration snapshot, performing a simulated network activation of the configuration snapshot that cross-validates the multiple network function changes in the configuration snapshot and indicates how the multiple network function changes will affect the network functions of the telecommunications network.

6. The method of claim 1, further comprising:

determining an implementation order for the multiple network function changes in the configuration snapshot; and atomically implementing the multiple network function changes across the telecommunications network based on the implementation order of the configuration snapshot.

7. The method of claim 6, wherein the implementation order is based on network function policies.

8. The method of claim 6, wherein the implementation order is based on grouping network function types corresponding to the multiple network function changes.

9. The method of claim 1, further comprising:

detecting a failure of a network function change during implementation of the multiple network function changes across the telecommunications network; and based on the failure, reverting the telecommunications network to a previous state before the configuration snapshot.

10. The method of claim 1, further comprising acknowledging receipt of a network function change by providing an acknowledgment that indicates that the network function change is being added to the pending changes set for future implementation.

11. The method of claim 1, further comprising:

determining that activating the configuration snapshot across the telecommunications network causes a network error after the configuration snapshot has been implemented; and based on detecting the network error, rolling back the network functions in the telecommunications network to a previous state based on a previous configuration snapshot.

12. A system comprising:

a processor; and memory including instructions that, when executed by the processor, cause the system to carry out operations comprising:

receiving, across multiple requests, multiple network function changes to modify network functions of a mobile packet core;

adding the multiple network function changes incrementally to a pending changes set without applying the multiple network function changes to the mobile packet core;

generating a configuration snapshot that includes the multiple network function changes in the pending changes set, wherein generating the configuration snapshot includes, prior to implementing the multiple network function changes represented within the configuration snapshot, cross-validating the multiple network function changes against each other in the pending changes set; and activating the configuration snapshot by in a single operation, such that the multiple network functions transition as a batch of network functions from a current state of a plurality of network functions to the desired state across all network functions of the plurality of network functions by implementing the multiple network function changes in the pending changes set in the mobile packet core atomically to ensure all of the multiple network function changes successfully implement.

13. The system of claim 12, wherein receiving the multiple network function changes includes receiving the multiple network function changes in separate application programming interface (API) calls across the multiple requests.

14. The system of claim 12, wherein the mobile packet core is implemented in a fifth generation (5G) telecommunications network.

15. The system of claim 12, further comprising additional instructions that, when executed by the processor, cause the system to carry out operations comprising:

determining an implementation order for the multiple network function changes in the configuration snapshot; and atomically implementing the multiple network function changes in the mobile packet core based on the implementation order of the configuration snapshot.

16. The system of claim 15, wherein the implementation order is based on a set of network function policies or grouping network function types corresponding to the multiple network function changes.

17. The system of claim 12, further comprising additional instructions that, when executed by the processor, cause the system to carry out operations comprising:

validating a given network function change being added to the pending changes set; and waiting to cross-validate the given network function change against other network function changes in the pending changes set before generating the configuration snapshot.

18. The system of claim 12, further comprising instructions that, when executed by the processor, cause the system to carry out operations comprising, before activating the configuration snapshot, performing a simulated network activation of the configuration snapshot that cross-validates the multiple network function changes in the configuration snapshot and indicates how the multiple network function changes will affect the network functions of the mobile packet core.

19. The system of claim 12, further comprising instructions that, when executed by the processor, cause the system to carry out operations comprising:

detecting a failure of a network function change during implementation of the multiple network function changes across the mobile packet core; and based on the failure, reverting the mobile packet core to a previous state before the configuration snapshot.

20. The system of claim 12, further comprising instructions that, when executed by the processor, cause the system to carry out operations comprising:

determining that activating the configuration snapshot across the mobile packet core causes a network error after the configuration snapshot has been implemented; and based on detecting the network error, rolling back the network functions in the mobile packet core to a previous state based on a previous configuration snapshot.

* * * * *